US012542361B2

(12) United States Patent
Hwang

(10) Patent No.: US 12,542,361 B2
(45) Date of Patent: Feb. 3, 2026

(54) MULTI-BAND ANTENNA MODULE

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 72 days.

(21) Appl. No.: 18/685,171

(22) PCT Filed: Aug. 16, 2022

(86) PCT No.: PCT/KR2022/012187
§ 371 (c)(1),
(2) Date: Feb. 20, 2024

(87) PCT Pub. No.: WO2023/022469
PCT Pub. Date: Feb. 23, 2023

(65) Prior Publication Data

US 2024/0396219 A1 Nov. 28, 2024

(30) Foreign Application Priority Data

Aug. 20, 2021 (KR) ........................ 10-2021-0109928

(51) Int. Cl.

| | |
|---|---|
| ***H01Q 9/04*** | (2006.01) |
| ***H01Q 1/50*** | (2006.01) |
| ***H01Q 9/30*** | (2006.01) |
| ***H01Q 21/30*** | (2006.01) |

(52) U.S. Cl.
CPC ............. *H01Q 9/0414* (2013.01); *H01Q 1/50* (2013.01); *H01Q 9/0457* (2013.01); *H01Q 9/30* (2013.01); *H01Q 21/30* (2013.01)

(58) Field of Classification Search
None
See application file for complete search history.

(56) References Cited

U.S. PATENT DOCUMENTS

| | | | | |
|---|---|---|---|---|
| 7,705,788 | B2 | 4/2010 | Hung et al. | |
| 9,520,655 | B2 * | 12/2016 | Cerreno ................. | H01Q 21/24 |
| 2020/0136269 | A1 * | 4/2020 | Choi .................... | H01Q 9/0435 |

FOREIGN PATENT DOCUMENTS

| | | | |
|---|---|---|---|
| KR | 10-2014-0119613 | A | 10/2014 |
| KR | 10-1664440 | B1 | 10/2016 |
| KR | 10-2021-0025457 | A | 3/2021 |
| KR | 10-2021-0043145 | A | 4/2021 |

* cited by examiner

*Primary Examiner* — Crystal L Hammond
(74) *Attorney, Agent, or Firm* — Maschoff Brennan

(57) ABSTRACT

Presented is a multi-band antenna module in which antennas having different polarization characteristics are coupled to prevent deterioration in isolation caused by interference between the antennas. The presented multi-band antenna module comprises: a patch antenna for transmitting/receiving a signal of a first frequency band; and a circuit board which has the patch antenna mounted on the top surface thereof, and which has a conductor pattern for transmitting/receiving a signal of a second frequency band while feeding the patch antenna.

17 Claims, 23 Drawing Sheets

[FIG. 12]

| Band | Freq. [MHz] | VSWR ( Voltage Standing Wave Ratio) | |
|---|---|---|---|
| | | Feed 1 | Feed 2 |
| Band 1 (2.4GHz) | 2400.00 | 2.89 | 2.90 |
| | 2442.50 | 2.00 | 1.95 |
| | 2485.00 | 1.53 | 1.50 |
| Band 2 (5GHz) | 5150.00 | 1.11 | 1.23 |
| | 5500.00 | 1.99 | 1.47 |
| | 5850.00 | 2.69 | 3.07 |

[FIG. 14]

| Band | Freq. [MHz] | S21 [-dB] |
|---|---|---|
| Band 1 (2.4GHz) | 2400.00 | 10.1 |
| | 2442.50 | 10.2 |
| | 2485.00 | 10.3 |
| Band 2 (5GHz) | 5150.00 | 16.6 |
| | 5500.00 | 17.9 |
| | 5850.00 | 33.7 |

| Band | Freq. [MHz] | Efficiency [%] | | Avg. Gain [dBi] | |
|---|---|---|---|---|---|
| | | Feed 1 | Feed 2 | Feed 1 | Feed 2 |
| Band 1 (2.4GHz) | 2400.00 | 52.38 | 45.26 | -2.81 | -3.44 |
| | 2442.50 | 65.17 | 62.14 | -1.86 | -2.07 |
| | 2485.00 | 49.99 | 55.27 | -3.01 | -2.58 |
| Band 2 (5GHz) | 5150.00 | 68.05 | 76.98 | -1.67 | -1.14 |
| | 5500.00 | 40.65 | 64.86 | -3.91 | -1.88 |
| | 5850.00 | 50.02 | 36.46 | -3.01 | -4.38 |

FIG. 15

[FIG. 20]

| Band | Freq. [MHz] | VSWR ( Voltage Standing Wave Ratio) | |
|---|---|---|---|
| | | Feed 1 | Feed 2 |
| Band 1 (2.4GHz) | 2400.00 | 2.93 | 2.33 |
| | 2442.50 | 2.26 | 2.11 |
| | 2485.00 | 1.80 | 1.98 |
| Band 2 (5GHz) | 5150.00 | 1.56 | 1.89 |
| | 5500.00 | 2.03 | 2.12 |
| | 5850.00 | 3.41 | 3.86 |

[FIG. 22]

| Band | Freq. [MHz] | S21 [-dB] |
|---|---|---|
| Band 1 (2.4GHz) | 2400.00 | 10.1 |
| | 2442.50 | 11.7 |
| | 2485.00 | 13.0 |
| Band 2 (5GHz) | 5150.00 | 18.4 |
| | 5500.00 | 17.4 |
| | 5850.00 | 18.6 |

| Band | Freq. [MHz] | Efficiency [%] | | Avg. Gain [dBi] | |
|---|---|---|---|---|---|
| | | Feed 1 | Feed 2 | Feed 1 | Feed 2 |
| Band 1 (2.4GHz) | 2400.00 | 46.51 | 36.40 | -3.32 | -4.39 |
| | 2442.50 | 70.97 | 57.18 | -1.49 | -2.43 |
| | 2485.00 | 63.61 | 57.16 | -1.96 | -2.43 |
| Band 2 (5GHz) | 5150.00 | 72.46 | 74.89 | -1.40 | -1.26 |
| | 5500.00 | 49.28 | 50.24 | -3.07 | -2.99 |
| | 5850.00 | 43.05 | 41.55 | -3.66 | -3.81 |

FIG. 23

MULTI-BAND ANTENNA MODULE

TECHNICAL FIELD

The present disclosure relates to a multi-band antenna module, and more particularly, to a multi-band antenna module that is mounted on an electronic device that constitutes a home network.

BACKGROUND ART

As the wireless communication technology is recently advanced, the wireless communication technology is applied to fields close to life, and a home network is an example of the application.

The home network means an environment in which various home appliances within a home communicate with each other over the network and the home appliances within the home can communicate with the outside through the Internet. In this case, a multi-band antenna module is mounted on an electronic device belonging to the home network because the electronic device needs to be capable of communicating with another electronic device.

A conventional multi-band antenna module is constructed to include multiple antennas that resonate in different frequency bands. In the conventional multi-band antenna module, interference occurs between antennas having the same polarization. In the conventional multi-band antenna module, an instant communication cutoff phenomenon occurs because separation (or isolation) is reduced due to interference between the antennas.

DISCLOSURE

Technical Problem

The present disclosure has been proposed by considering the circumstances, and an object of the present disclosure is to provide a multi-band antenna module which prevents a reduction of separation (or isolation) attributable to interference between antennas by combining antennas having different polarization characteristics.

Furthermore, another object of the present disclosure is to provide a multi-band antenna module which improves the amount of transmission and a transfer rate by increasing a channel by combining antennas having different polarization characteristics and enables stable communication by preventing interference between antennas.

Furthermore, still another object of the present disclosure is to provide a multi-band antenna module which transmits and receives signals having frequency bands of 2.4 GHZ and 6E (5G to 7G) by combining antennas having different polarization characteristics.

Technical Solution

In order to achieve the object, a multi-band antenna module according to a first embodiment of the present disclosure includes a circuit board and a patch antenna disposed on an upper surface of the circuit board and configured to transmit or receive a signal having a first frequency band. A first conductor pattern that transmits or receives a signal having a second frequency band while feeding power to the patch antenna is formed in the circuit board.

The patch antenna may include a dielectric, an upper patch disposed on an upper surface of the dielectric, a first lower patch having a first slot formed therein and disposed on a lower surface of the dielectric, and a second lower patch disposed on the lower surface of the dielectric and disposed so that the second lower patch is accommodated in a space that is formed by the first slot and the lower surface of the dielectric.

A first area that is an area in which the patch antenna is mounted, a second area that is remaining areas except the first area, and a first upper clearance area that is an area covering the first area and the second area may be defined on the upper surface of the circuit board.

The first upper clearance area may include a first clearance area that is formed in the first area and that overlaps the patch antenna and a second clearance area that is formed in the second area, that is combined with the first clearance area, and that has an opening formed on one side thereof.

The first conductor pattern may include a first pattern disposed to cover the first clearance area and the second clearance area and a second pattern that is disposed in the first clearance area and that overlaps the patch antenna. A first connection pad connected to a power feed part may be formed at a first end of the first pattern. The second pattern may be connected to a second end of the first pattern. In this case, the second pattern may form a power feed pad by being connected to the second lower patch, and the power feed pad may be connected to the upper patch by coupling in the state in which the power feed pad has been spaced apart from the upper patch. In this case, the circuit board may further include a matching circuit connected to the first pattern.

Meanwhile, a first lower clearance area symmetrical to the first upper clearance area may be further defined in a lower surface of the circuit board. The first conductor pattern may include a first pattern disposed in the first lower clearance area, and a second pattern that is disposed in a first clearance area of the first upper clearance area and that overlaps the patch antenna. A first connection pad connected to the power feed part may be formed at a first end of the first pattern. The second pattern may be connected to a second end of the first pattern through a via hole.

In order to achieve the object, a multi-band antenna module according to a second embodiment of the present disclosure includes a circuit board and a patch antenna disposed on an upper surface of the circuit board and configured to transmit or receive a signal having a first frequency band. A first conductor pattern and a second conductor pattern that transmit or receive a signal having a second frequency band while feeding power to the patch antenna are formed in the circuit board.

The patch antenna may include a dielectric, an upper patch disposed on an upper surface of the dielectric, a first lower patch having a first slot and a second slot formed therein and disposed on a lower surface of the dielectric, a second lower patch disposed on the lower surface of the dielectric and disposed so that the second lower patch is accommodated in a space that is formed by the first slot and the lower surface of the dielectric, and a third lower patch disposed on the lower surface of the dielectric and disposed so that the third lower patch is accommodated in a space that is formed by the second slot and the lower surface of the dielectric.

A first area that is an area in which the patch antenna is mounted, a second area that is remaining areas except the first area, a first upper clearance area that is an area covering the first area and the second area, and a second upper clearance area that is an area that is isolated from the first upper clearance area and that covers the first area and the second area may be defined on the upper surface of the circuit board.

The first upper clearance area may include a first clearance area that is formed in the first area and that overlaps the patch antenna, and a second clearance area that is formed in the second area, that is combined with the first clearance area, and that has an opening formed on one side thereof. The second upper clearance area may include a third clearance area that is formed in the first area, that is isolated from the first clearance area, and that overlaps the patch antenna, and a fourth clearance area that is formed in the second area, that is isolated from the second clearance area, that is combined with the third clearance area, and that has an opening formed on one side thereof.

The first conductor pattern may include a first pattern disposed to cover the first clearance area and the second clearance area and a second pattern that is disposed in the first clearance area and that overlaps the patch antenna. A first connection pad connected to the power feed part may be formed at a first end of the first pattern. The second pattern may be connected to a second end of the first pattern. The second conductor pattern may include a third pattern disposed to cover the third clearance area and the fourth clearance area and a fourth pattern that is disposed in the third clearance area and that overlaps the patch antenna. A second connection pad connected to a power feed part may be formed at a first end of the third pattern. The fourth pattern may be connected to a second end of the third pattern. In this case, the second pattern may form a power feed pad by being connected to the second lower patch. The fourth pattern may form another power feed pad by being connected to the third lower patch. The power feed pad and the another power feed pad may be spaced apart from each other, and may be connected to the upper patch by coupling in the state in which the power feed pad and the another power feed pad have been spaced apart from the upper patch.

The circuit board may further include a matching circuit connected to the first pattern and another matching circuit connected to the third pattern.

Meanwhile, a first lower clearance area symmetrical to the first upper clearance area and a second lower clearance area symmetrical to the second upper clearance area may be further defined on the lower surface of the circuit board. The first conductor pattern may include a first pattern disposed in the first lower clearance area, and a second pattern that is disposed in a first clearance area of the first upper clearance area and that overlaps the patch antenna. A first connection pad to which a power feed part is connected may be formed at a first end of the first pattern, and the second pattern is connected to a second end of the first pattern through a via hole. The second conductor pattern may include a third pattern disposed in the second lower clearance area, and a fourth pattern that is disposed in a third clearance area of the second upper clearance area and that overlaps the patch antenna. A second connection pad connected to a power feed part may be formed at a first end of the third pattern. The fourth pattern may be connected to a second end of the third pattern through a via hole. In this case, a first virtual straight line that connects the first pattern and the second pattern and a second virtual straight line that connects the third pattern and the fourth pattern may be orthogonal to each other.

Advantageous Effects

According to the present disclosure, the multi-band antenna module has an effect in that it can receive signals having multiple bands by preventing the occurrence of interference between antennas while preventing a reduction of separation (or isolation), by combining antennas having different polarization characteristics.

Furthermore, the multi-band antenna module has an effect in that it can implement a multiple input multiple output (MIMO) antenna and/or a diversity antenna by forming two power feed lines that feed power to the patch antenna and constructing the two power feed lines as a radiator that resonates in a frequency band different from the frequency band of the patch antenna.

Furthermore, the multi-band antenna module has effects in that it can minimize a channel loss and interference by constructing the MIMO antenna and can increase a communication speed by increasing the amount of transmission along with a channel increase.

Furthermore, the multi-band antenna module has an effect in that it is capable of stable communication by minimizing a signal loss attributable to channel interference while increasing a data transmission capacity by constructing the diversity antenna.

DESCRIPTION OF DRAWINGS

FIGS. 10 to 15 are diagrams for describing antenna characteristics of the multi-band antenna module to which the circuit board illustrated in FIGS. 7 and 9 has been applied.

FIGS. 18 to 23 are diagrams for describing antenna characteristics of the multi-band antenna module to which the circuit board illustrated in FIGS. 16 and 17 has been applied.

MODE FOR INVENTION

Figure 1:
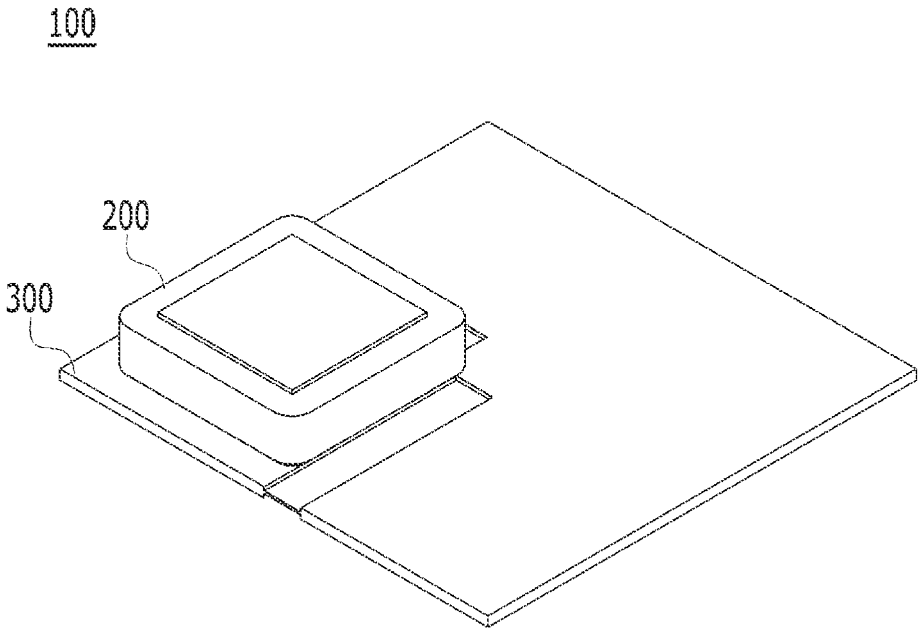
FIG. 1 is a diagram for describing a construction of a multi-band antenna module according to an embodiment of the present disclosure.

Hereinafter, the most preferred embodiments of the present disclosure will be described with reference to the accompanying drawings in order to specifically describe the embodiments to the extent that a person having ordinary knowledge in the art to which the present disclosure pertains may easily implement the technical spirit of the present disclosure. First, in adding reference numerals to the components of each drawing, it should be noted that the same components have the same reference numerals as much as possible even if they are displayed in different drawings. Furthermore, in describing the present disclosure, when it is determined that the detailed description of the related wellknown configuration or function may obscure the subject matter of the present disclosure, the detailed description thereof will be omitted.

Referring to FIG. 1, a multi-band antenna module 100 according to an embodiment of the present disclosure operates as a multi-band antenna by using two antennas having different radiation types. That is, the multi-band antenna module 100 operates as a multi-band antenna by combining a patch antenna 200 having a directional radiation type and a monopole antenna having a non-directional (or omni-directional) radiation type. In this case, the monopole antenna is formed in a circuit board 300.

If the multi-band antenna module 100 includes antennas having similar polarization, separation (or isolation) is reduced because interference occurs between the antennas.

Accordingly, the multi-band antenna module 100 according to an embodiment of the present disclosure minimizes the occurrence of interference between antennas and thus minimizes a reduction of separation (or isolation) by providing a complex structure in which the directional patch antenna 200 and the non-directional monopole antenna having different types of polarization have been combined.

To this end, the multi-band antenna module 100 is constructed to include the patch antenna 200 and the circuit board 300. That is, the multi-band antenna module 100 is constructed in a form in which the patch antenna 200 having the directional radiation type has been mounted on the circuit board 300 in which a monopole pattern antenna, that is, a non-directional antenna, has been formed. In this case, an example in which the patch antenna 200 has a radiator for upward radiation is taken.

The patch antenna 200 operates as an antenna that resonates in a first frequency band. In this case, an example in which the first frequency band is a Wi-Fi frequency band of about 2.4 GHZ is taken.

Figure 2:
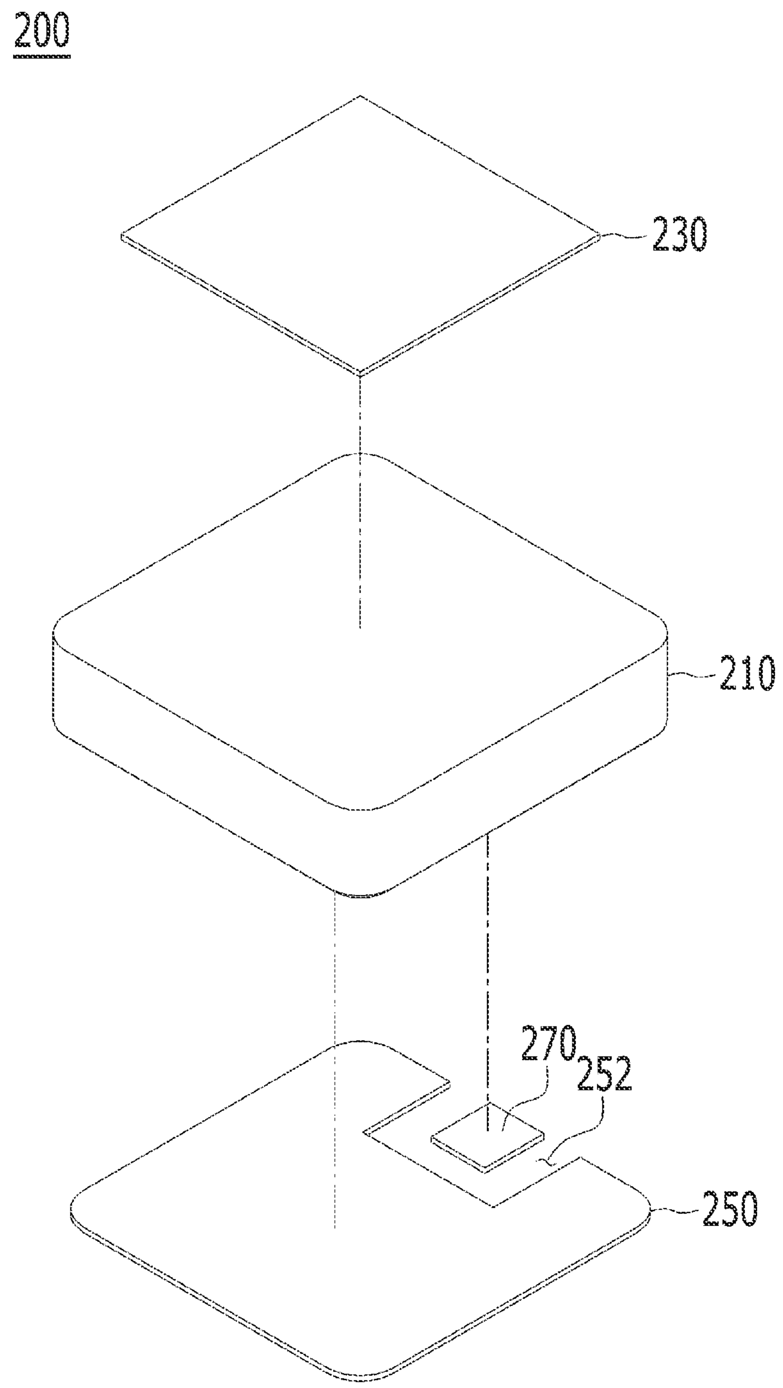
FIG. 2 is a diagram for describing a patch antenna of FIG. 1.

Referring to FIG. 2, the patch antenna 200 is constructed to include a base 210, an upper patch 230, a first lower patch 250, and a second lower patch 270.

The base substrate 210 consists of a dielectric body having an upper surface, a lower surface, and a plurality of sides. An example in which the base substrate 210 consists of a dielectric substrate made of a ceramic material having characteristics, such as a high dielectric constant and a low coefficient of thermal expansion is taken. In this case, the lower surface of the base substrate 210 is a surface that comes into contact with an upper surface of the circuit board 300 while facing the upper surface when the patch antenna 200 is mounted on the circuit board 300. The upper surface of the base substrate 210 is a face that is opposite to the upper surface of the circuit board 300 with the lower surface of the base substrate 210 interposed therebetween.

The base substrate 210 may be made of a magnetic body having an upper surface, a lower surface, and a plurality of sides. An example in which the base substrate 210 consists of a magnetic material substrate made of a magnetic material, such as ferrite, is taken.

The upper patch 230 is disposed on the upper surface of the base substrate 210. The upper patch 230 consists of a thin plate made of a conductive material having high electric conductivity, such as copper, aluminum, gold, or silver. The upper patch 230 may be formed in various shapes, such as a square, a triangle, and an octagon, depending on a shape of the base substrate 210. The upper patch 230 may be deformed in various shapes through a process, such as frequency tuning.

The first lower patch 250 is disposed in the lower surface of the base substrate 210. The first lower patch 250 consists of a thin plate made of a conductive material having high electric conductivity, such as copper, aluminum, gold, or silver. The first lower patch 250 may be formed in various shapes, such as a square, a triangle, and an octagon, depending on a shape of the base substrate 210. In this case, an example in which the first lower patch 250 is a patch for ground GND is taken.

A first slot 252 that accommodates the second lower patch 270 is formed in the first lower patch 250. In this case, the first slot 252 is formed to include an area that overlaps a second pattern 322 of a first conductor pattern 320 that is formed in the circuit board 300, which will be described later. The first slot 252 is formed to have a wider area than the second lower patch 270 so that the first lower patch 250 is spaced apart from the second lower patch 270 at a predetermined interval when the first lower patch 250 and the second lower patch 270 are disposed on the lower surface of the base substrate 210.

The second lower patch 270 is disposed on the lower surface of the base substrate 210. The second lower patch 270 is accommodated in a space that is formed by the lower surface of the base substrate 210 and the first slot 252 of the first lower patch 250. The second lower patch 270 is disposed to be spaced apart from the first lower patch 250 at a predetermined interval on the lower surface of the base substrate 210.

The second lower patch 270 consists of a thin plate made of a conductive material having high electric conductivity, such as copper, aluminum, gold, or silver. As the patch antenna 200 is mounted on the circuit board 300, the second lower patch 270 is connected to the second pattern 322 of the first conductor pattern 320 that is formed in the circuit board 300, thus forming a power feed pad.

The upper patch 230 operates as an antenna that resonates in the first frequency band by being fed with power through electromagnetic coupling with a power feed pad (i.e., the second lower patch 270 and the second pattern 322) that is formed in the circuit board 300.

The upper patch 230 operates as a radiator that resonates to a signal having the first frequency band, that is, approximately 2.4 GHZ, by being fed with power through electromagnetic coupling (i.e., coupling) in the state in which the upper patch 230 has been spaced apart from the power feed pad at a predetermined interval without being directly connected to the power feed pad.

In this case, in FIG. 2, it has been described that the upper patch 230 is fed with power by being connected to the power feed pad, but the present disclosure is not limited thereto. The upper patch 230 may be constructed to be fed with power through a structure in which via holes are formed in the base substrate 210 and the upper patch 230 and a power feed pin connects the power feed pad and the upper patch 230 through the via holes.

The circuit board 300 is a printed circuit board on which the patch antenna 200 is mounted. The circuit board 300 is a stack board on which a resin layer, a metal layer, a coverlay layer, etc. have been stacked.

Figure 3:
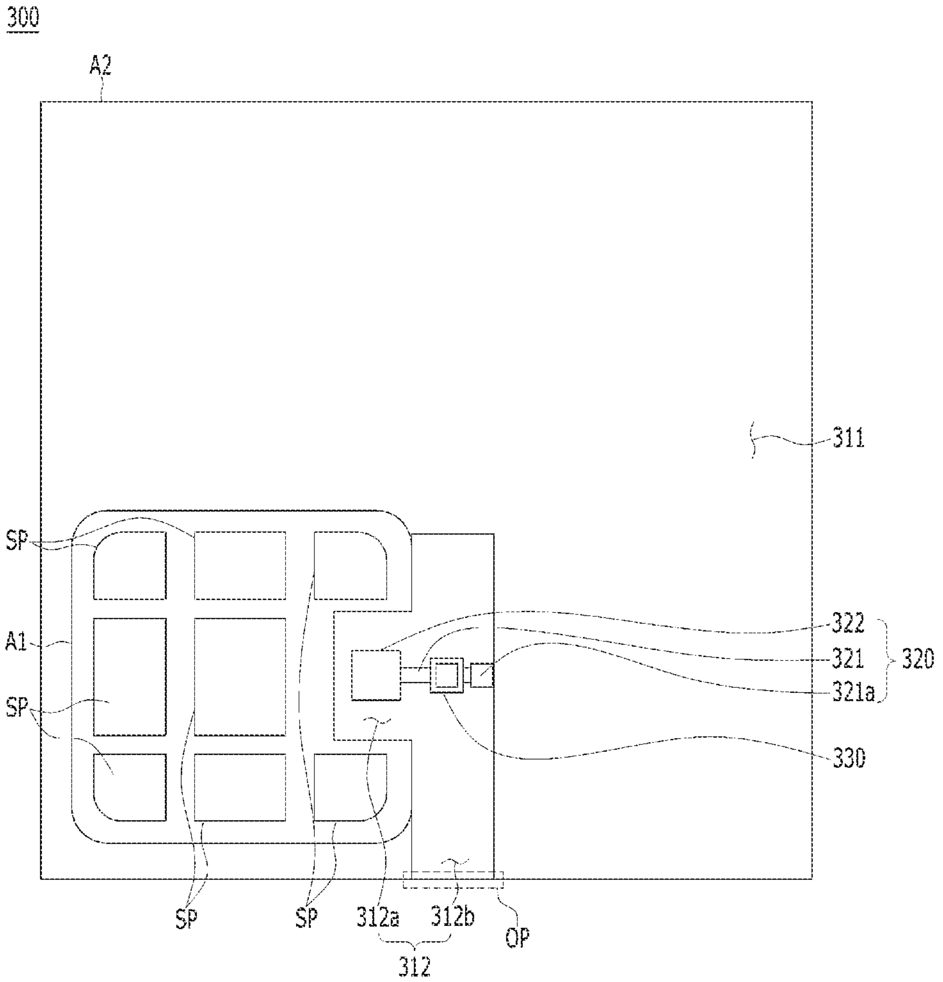
FIGS. 3 and 4 are a top view and bottom view of a circuit board for describing a first embodiment of a circuit board of FIG. 1.
Figure 4:
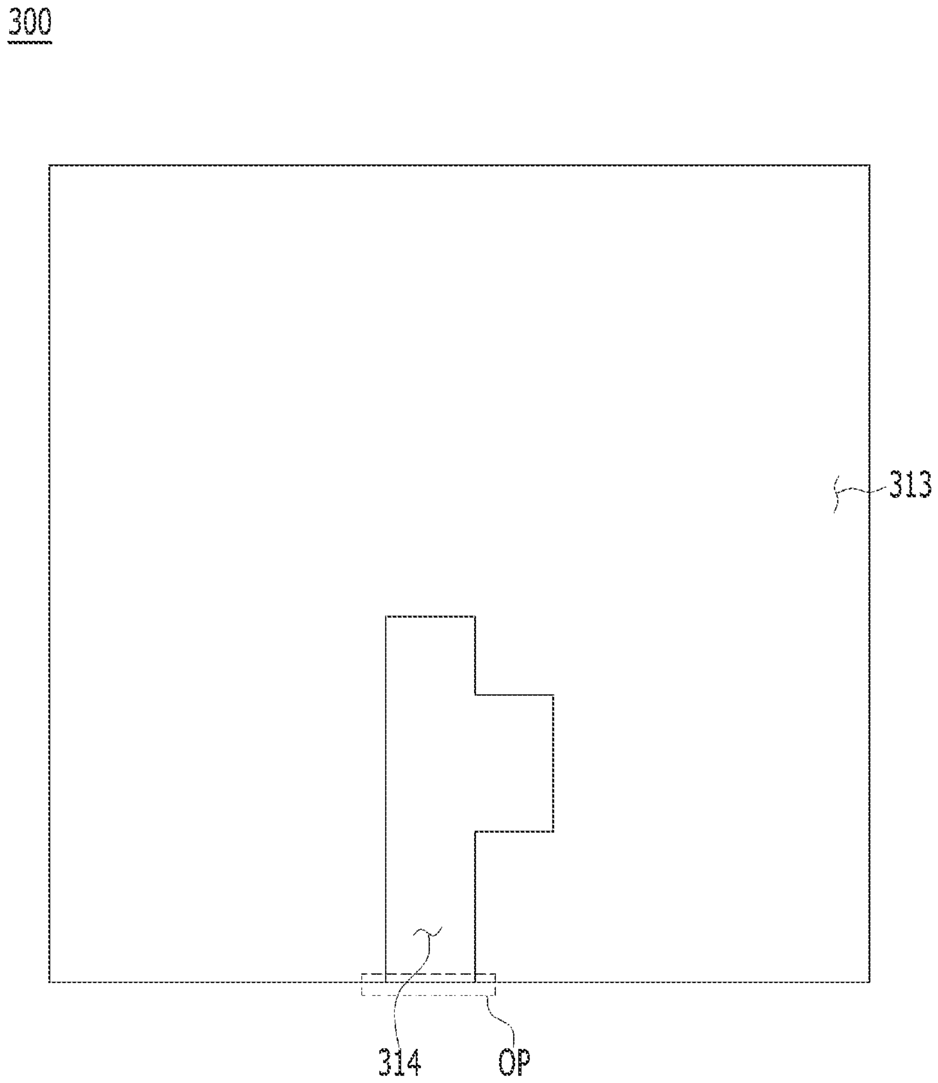

Referring to FIGS. 3 and 4, a first area A1 and a second area A2 may be defined in the upper surface of the circuit board 300 on the basis of the location where the patch antenna 200 is mounted.

The first area A1 is an area in which the patch antenna 200 is mounted. In this case, one or more soldering points SP for connecting the patch antenna 200 by soldering may be formed in the first area A1. In this case, an example in which the soldering point SP is an area in which the metal layer has been exposed by removing the coverlay layer of the circuit board 300 is taken. In this case, the soldering point SP is connected to the first lower patch 250 of the patch antenna 200.

The second area A2 is an area of the circuit board 300 except the first area A1. That is, the second area A2 is the remaining area of the entire upper surface of the circuit board 300 disposed in the second area A2, except the first area A1 in which the patch antenna 200 is mounted.

An upper ground area 311 and a first upper clearance area 312 are defined in the upper surface of the circuit board 300. In this case, a lower ground area 313 and a first lower clearance area 314 may be defined in a lower surface of the circuit board 300. The first lower clearance area 314 is defined to be symmetrical to the first upper clearance area 312 with the resin layer of the circuit board 300 interposed therebetween.

The upper ground area 311 is an area of the circuit board 300, which operates as a ground. An example in which the upper ground area 311 is an area of the circuit board 300 on which the resin layer, the metal layer, and the coverlay layer have been stacked in the state in which the resin layer, the metal layer, the coverlay layer, etc. have not been removed is taken.

The first upper clearance area 312 is an area of the circuit board 300, which corresponds to a non-ground. The first upper clearance area 312 is an area from which the remaining layers (the metal layer, the coverlay layer, etc.) of the circuit board 300 except the resin layer have been removed. Accordingly, the first upper clearance area 312 is an area in which the resin layer has been exposed in the upper surface of the circuit board 300.

The first upper clearance area 312 includes a first clearance area 312*a* and a second clearance area 312*b*.

The first clearance area 312*a* is a clearance area that is formed in some area of the first area A1. The first clearance area 312*a* is formed in some area of the first area A1, and thus overlaps the patch antenna 200 mounted on the circuit board 300.

The second clearance area 312*b* is a clearance area that is formed in some area of the second area A2. The second clearance area 312*b* is formed in some area of the second area A2, and thus does not overlap the patch antenna 200 mounted on the circuit board 300. In this case, an example in which the second clearance area 312*b* has been formed to have a width of approximately 3 mm or more to 6 mm or less and a length of 10 mm or more is taken.

The second clearance area 312*b* is formed to adjoin one side of the first area A1. One side of the second clearance area 312*b* is formed to be disposed on the same line as one side of the circuit board 300, and forms an opening OP of the second clearance area 312*b*.

The first clearance area 312*a* and the second clearance area 312*b* are interconnected to form the first upper clearance area 312. Accordingly, the first upper clearance area 312 is defined as a structure that is disposed on the outside (i.e., the second area A2) on one side of the first area A1 and a part of the structure is inserted and disposed in the first area A1. In this case, a shape of the first upper clearance area 312 may be formed in various shapes in addition to the shape illustrated in the drawing.

The first conductor pattern 320 that operates as a microstrip line antenna, that is, a non-directional radiation type, is formed in the circuit board 300. In this case, the first conductor pattern 320 operates as a power feed line of the patch antenna 200 while operating as the antenna having the non-directional radiation type.

The first conductor pattern 320 may be formed simultaneously with the forming of the first upper clearance area 312. That is, the first conductor pattern 320 may be formed by removing the metal layer and coverlay layer of areas except an area corresponding to the first conductor pattern 320 in a process of forming the first upper clearance area 312. In this case, the first conductor pattern 320 may be formed as an island pattern that is formed to be isolated from an outer circumference of the first upper clearance area 312 within the first upper clearance area 312.

The first conductor pattern 320 is constructed to include a first pattern 321 and the second pattern 322.

The first pattern 321 is disposed in the second clearance area 312*b* and connected to a power feed part (not illustrated) and the second pattern 322. A first end of the first pattern 321 is connected to the power feed part (not illustrated). A second end of the first pattern 321 is connected to the second pattern 322. In this case, a first connection pad 321*a*, that is, the metal layer exposed because the coverlay layer is removed for a connection with the power feed part (not illustrated), may be formed at the first end of the first pattern 321.

The second pattern 322 is disposed in the first clearance area 312*a*, and overlaps the patch antenna 200 mounted on the circuit board 300. The second pattern 322 is connected to the power feed part (not illustrated) through the first pattern 321. The second pattern 322 is connected to the second lower patch 270 of the patch antenna 200, thus forming the power feed pad that feeds power to the upper patch 230. The power feed pad feeds power to the upper patch 230 by being subjected to electromagnetic coupling with the upper patch 230 of the patch antenna 200. To this end, the second pattern 322 may be the metal layer that is exposed because the coverlay layer is removed in order to form the power feed pad by being connected to the second lower patch 270.

Meanwhile, a matching circuit 330 for impedance adjustment may be connected to the first pattern 321. The matching circuit 330 is disposed over the first pattern 321, and minimizes a reflection loss I by generating impedance close to 50 ohm impedance.

Figure 5:
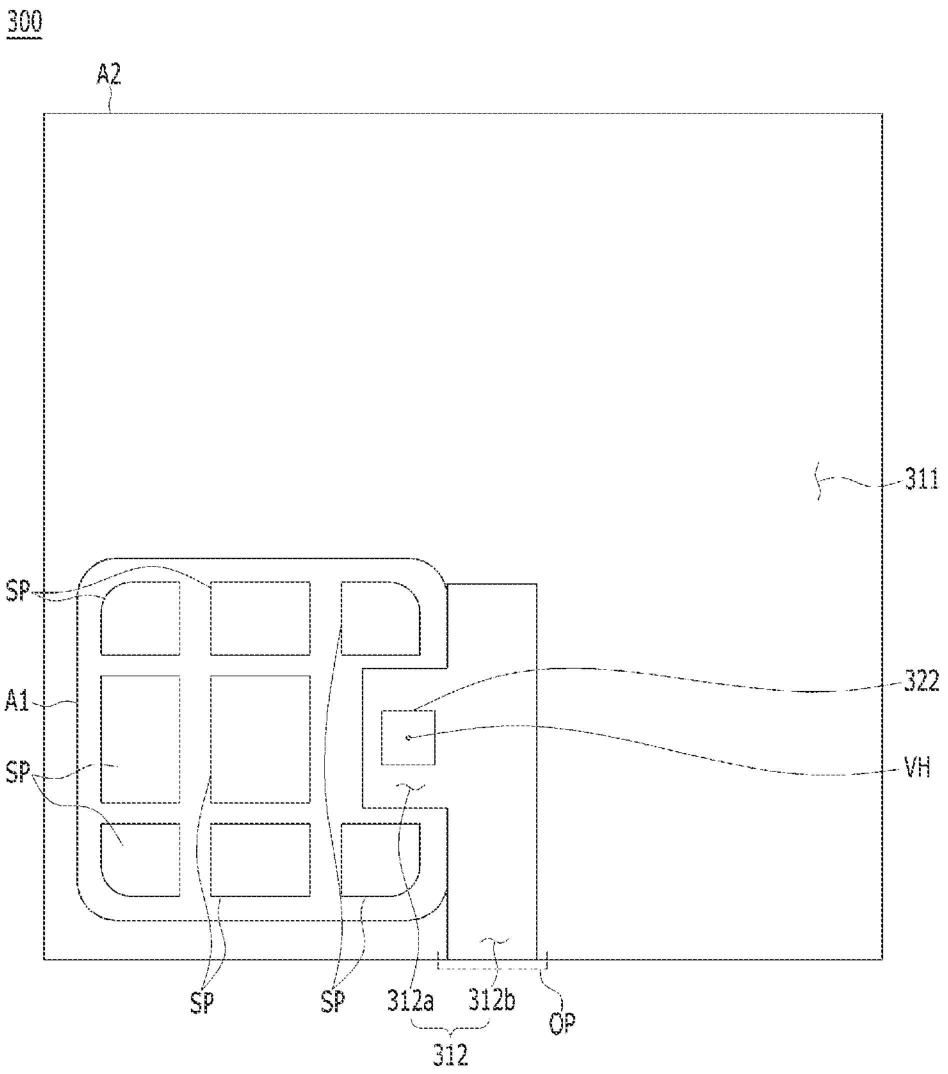
FIGS. 5 and 6 are a top view and bottom view of a circuit board for describing a second embodiment of the circuit board of FIG. 1.
Figure 6:
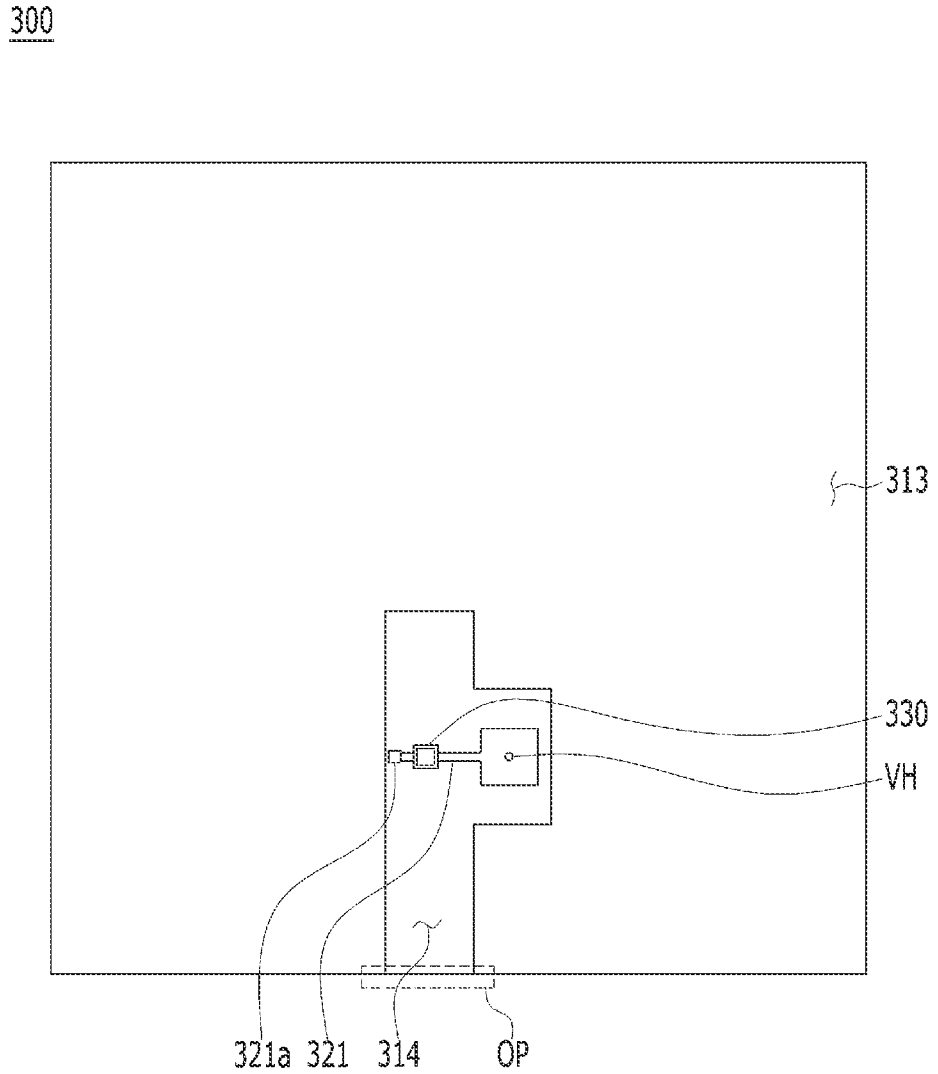

Referring to FIGS. 5 and 6, the first pattern 321 may be disposed in the first lower clearance area 314. In this case, the second end of the first pattern 321 is connected to the second pattern 322 through a via hole VH.

The first pattern 321 may be formed simultaneously with the forming of the first lower clearance area 314. The second pattern 322 may be formed simultaneously with the forming of the first upper clearance area 312.

That is, the first pattern 321 is formed by removing the metal layer and coverlay layer of areas except an area corresponding to the first pattern 321 in a process of forming the first lower clearance area 314. The second pattern 322 is formed by removing the metal layer and coverlay layer of areas except an area corresponding to the second pattern 322 in a process of forming the first upper clearance area 312.

Accordingly, the first pattern 321 may be formed as an island pattern that is formed within the first lower clearance area 314 and that is spaced apart from an outer circumference of the first lower clearance area 314. The second pattern 322 may be formed as an island pattern that is formed within the first clearance area 312*a* of the first upper clearance area 312.

Figure 7:
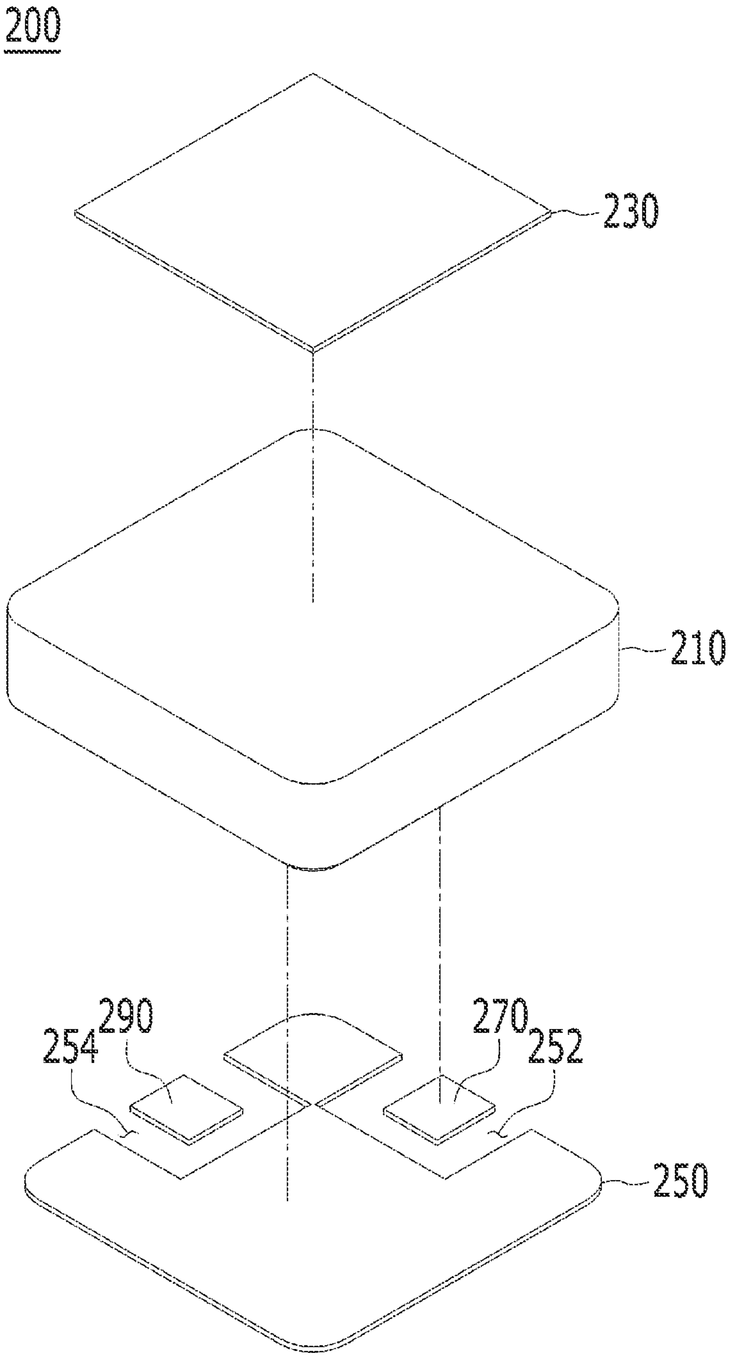
FIG. 7 is a diagram for describing a modified example of the patch antenna of FIG. 1.

Referring to FIG. 7, the patch antenna 200 may further include a third lower patch 290.

A second slot 254 that accommodates the third lower patch 290 is further formed in the first lower patch 250. In this case, the second slot 254 is formed to include an area that overlaps a fourth pattern 342 of a second conductor pattern 340 that is formed in the circuit board 300, which will be described later.

The second slot 254 is disposed to be twisted with respect to the first slot 252 approximately 90 degrees. That is, a first virtual straight line that connects the first slot 252 and a central axis of the patch antenna and a second virtual straight line that connects the second slot 254 and the central axis of the patch antenna are orthogonal to each other.

The second slot 254 is formed to have a wider area than the third lower patch 290 so that the first lower patch 250 is spaced apart from the third lower patch 290 at a predetermined interval when the first lower patch 250 to the third lower patch 290 are disposed on the lower surface of the base substrate 210. Accordingly, the third lower patch 290 is spaced apart from the first lower patch 250 at a predetermined interval on the lower surface of the base substrate 210.

The third lower patch 290 is disposed on the lower surface of the base substrate 210. The third lower patch 290 is accommodated in a space that is formed by the lower surface of the base substrate 210 and the second slot 254 of the first lower patch 250.

A virtual straight line that connects the third lower patch 290 and the central axis of the patch antenna 200 and a virtual straight line that connects the lower patch 270 and the central axis of the patch antenna 200 are orthogonal to each other. Accordingly, the third lower patch 290 is disposed to be twisted approximately 90 degrees with respect to the second lower patch 270.

The third lower patch 290 consists of a thin plate made of a conductive material having high electric conductivity, such as copper, aluminum, gold, or silver. As the patch antenna 200 is mounted on the circuit board 300, the third lower patch 290 forms a power feed pad by being connected to the fourth pattern 342 of the second conductor pattern 340 formed in the circuit board 300.

The upper patch 230 operates as an MIMO antenna or a diversity antenna that resonates in the first frequency band by being fed with power through electromagnetic coupling with two power feed pads that are formed by the second lower patch 270 and the third lower patch 290. The upper patch 230 operates as a radiator that resonates to a signal having the first frequency band, that is, approximately 2.4 GHZ, by being fed with power through electromagnetic coupling (i.e., coupling) in the state in which the upper patch 230 has been spaced apart from the two power feed pads at a predetermined interval without being directly connected to the power feed pads.

In this case, in FIG. 7, it has been described that the upper patch 230 is fed with power by being connected to the power feed pad by coupling, but the present disclosure is not limited thereto. The upper patch 230 may be constructed to have a structure in which two via holes are formed in the base substrate 210 and the upper patch 230, a power feed pin connects the power feed pad and the upper patch 230 through the via holes, and the upper patch 230 is fed with power through the power feed pin.

Figure 8:
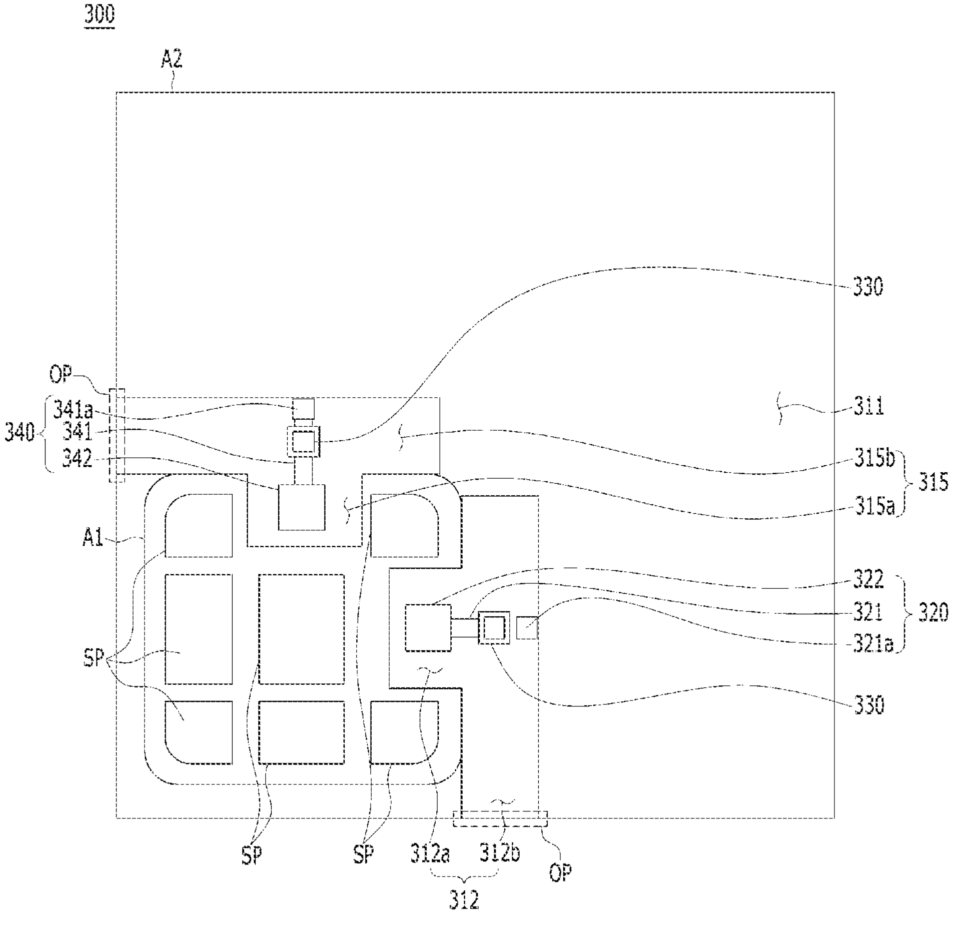
FIGS. 8 and 9 are a top view and bottom view of a circuit board for describing a third embodiment of the circuit board of FIG. 1.
Figure 9:
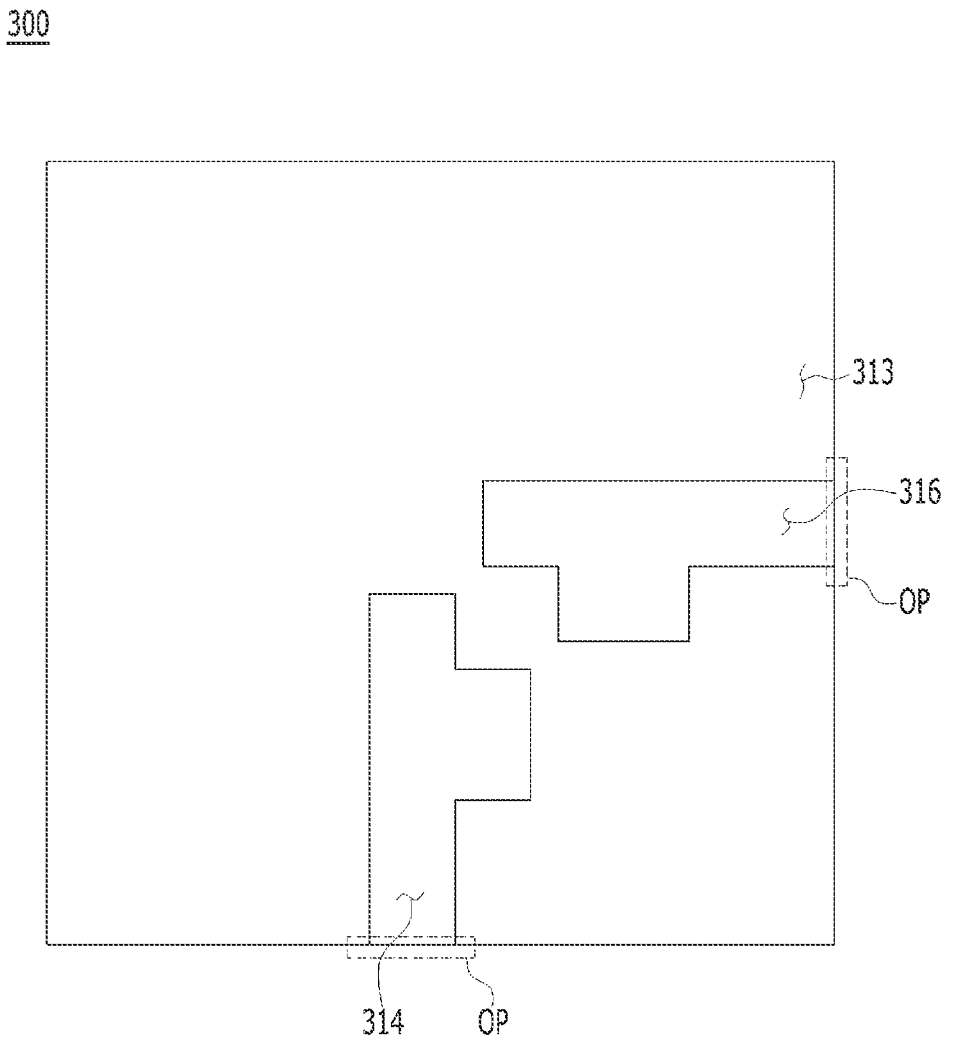

Referring to FIGS. 8 and 9, a second upper clearance area 315 and a second lower clearance area 316 may be further defined in the circuit board 300.

The second upper clearance area 315 is defined in the upper surface of the circuit board 300. The second lower clearance area 316 is defined in the lower surface of the circuit board 300. In this case, the second upper clearance area 315 and the second lower clearance area 316 may be defined to be symmetrical to each other with the resin layer of the circuit board 300 interposed therebetween.

The second upper clearance area 315 includes a third clearance area **315*a* and a fourth clearance area 315*b***.

The third clearance area **315*a* is a clearance area that is formed in some area of the first area A1. As the third clearance area 315*a* is formed in some area of the first area A1, the third clearance area 315*a* overlaps a part of the patch antenna 200 mounted on the circuit board 300**.

The fourth clearance area **315*b* is a clearance area that is formed in some area of the second area A2. As the fourth clearance area 315*b* is formed in some area of the second area A2, the fourth clearance area 315*b* does not overlap the patch antenna 200 mounted on the circuit board 300. In this case, an example in which the fourth clearance area 315*b*** has been formed to have a width of approximately 3 mm or more to 6 mm or less and a length of 10 mm or more is taken.

The fourth clearance area **315*b* is formed to adjoin one side of the first area A1. In this case, the fourth clearance area 315*b* is formed to adjoin the other side of the second area A2, which adjoins one side of the second area A2 in which the second clearance area 312*b*** has been formed.

For example, it is assumed that the first area A1 is defined in the form of a quadrangle having a first side, a second side opposite to the first side, a third side connected to a first end of the first side and a first end of the second side, and a fourth side that is opposite to the third side and that is connected to a second end of the first side and a second end of the second side. If the second clearance area **312*b* is formed to adjoin the first side and the second side and the third side are disposed to adjoin an outer circumference of the circuit board 300, the fourth clearance area 315*b*** is formed to adjoin the fourth side that adjoins the first side.

The fourth clearance area **315*b* is formed to adjoin one side of the circuit board 300. One side of the fourth clearance area 315*b* is disposed on the same line as one side of the circuit board 300, thus forming an opening OP of the fourth clearance area 315*b***.

The third clearance area **315*a* and the fourth clearance area 315*b* are interconnected to form the second upper clearance area 315. Accordingly, the second upper clearance area 315 is disposed on the outside (i.e., the second area A2) on one side of the first area A1, and a part of the second upper clearance area 315 is inserted and disposed in the first area A1. In this case, a shape of the second upper clearance area 315** may be formed in various shapes in addition to the shape illustrated in the drawing.

The second conductor pattern 340 that operates as a micro-strip line antenna, that is, a non-directional radiation type, may be further formed in the circuit board 300. In this case, the second conductor pattern 340 operates as the power feed line of the patch antenna 200 while operating as the antenna having the non-directional radiation type.

The second conductor pattern 340 operates as a micro-strip line antenna having polarization different from that of the first conductor pattern 320. To this end, the second conductor pattern 340 is disposed to be twisted approximately 90 degrees with respect to the first conductor pattern 320 in the circuit board 300.

The second conductor pattern 340 may be formed simultaneously with the forming of the second upper clearance area 315. That is, the second conductor pattern 340 is formed by removing the metal layer and coverlay layer of areas except an area corresponding to the second conductor pattern 340 in a process of forming the second upper clearance area 315. In this case, the second conductor pattern 340 may be formed as an island pattern that is formed within the second upper clearance area 315 and that is spaced apart from an outer circumference of the second upper clearance area 315.

The second conductor pattern 340 is constructed to include a third pattern 341 and the fourth pattern 342. In this case, a first virtual straight line that connects the first pattern 321 and second pattern 322 of the first conductor pattern 320 and a second virtual straight line that connects the third pattern 341 and fourth pattern 342 of the second conductor pattern 340 are orthogonal to each other so that the first conductor pattern 320 and the second conductor pattern 340 are twisted each other approximately 90 degrees.

The third pattern 341 is disposed in the fourth clearance area 315*b* and connected to a power feed part and the fourth pattern 342. A first end of the third pattern 341 is connected to the power feed part (not illustrated). A second end of the third pattern 341 is connected to the fourth pattern 342. In this case, a second connection pad 341*a*, that is, the metal layer exposed because the coverlay layer is removed for a connection with the power feed part (not illustrated), may be formed at the first end of the third pattern 341. In this case, the first conductor pattern 320 and the second conductor pattern 340 are connected to different power feed parts (not illustrated).

The fourth pattern 342 is disposed in the third clearance area 315*a*, and overlaps the patch antenna 200 mounted on the circuit board 300. The fourth pattern 342 is connected to the power feed part (not illustrated) through the third pattern 341. The fourth pattern 342 is connected to the third lower patch 290 of the patch antenna 200, thus forming a power feed pad that feeds power to the upper patch 230. The power feed pad feeds power to the upper patch 230 by being subjected to electromagnetic coupling with the upper patch 230 of the patch antenna 200. To this end, the fourth pattern 342 may be a metal layer exposed because the coverlay layer is removed in order to form the power feed pad by being connected to the third lower patch 290.

Meanwhile, the matching circuit 330 for impedance adjustment may be connected to the third pattern 341. The matching circuit 330 is disposed over the third pattern 341, and minimizes a reflection loss I by generating impedance close to 50 ohm impedance.

As described above, the multi-band antenna module 100 can implement a multiple input multiple output (MIMO) antenna and/or a diversity antenna by forming the two power feed lines that feed power to the patch antenna 200 and constructing the two power feed lines as the radiators that resonate in a frequency band different from that of the patch antenna 200.

Furthermore, the multi-band antenna module 100 can minimize a channel loss and interference by constructing the MIMO antenna, and can increase a communication speed by increasing the amount of transmission along with a channel increase.

Furthermore, the multi-band antenna module 100 enables stable communication by minimizing a signal loss attributable to channel interference while increasing a data transmission capacity by constructing the diversity antenna.

Figure 10:
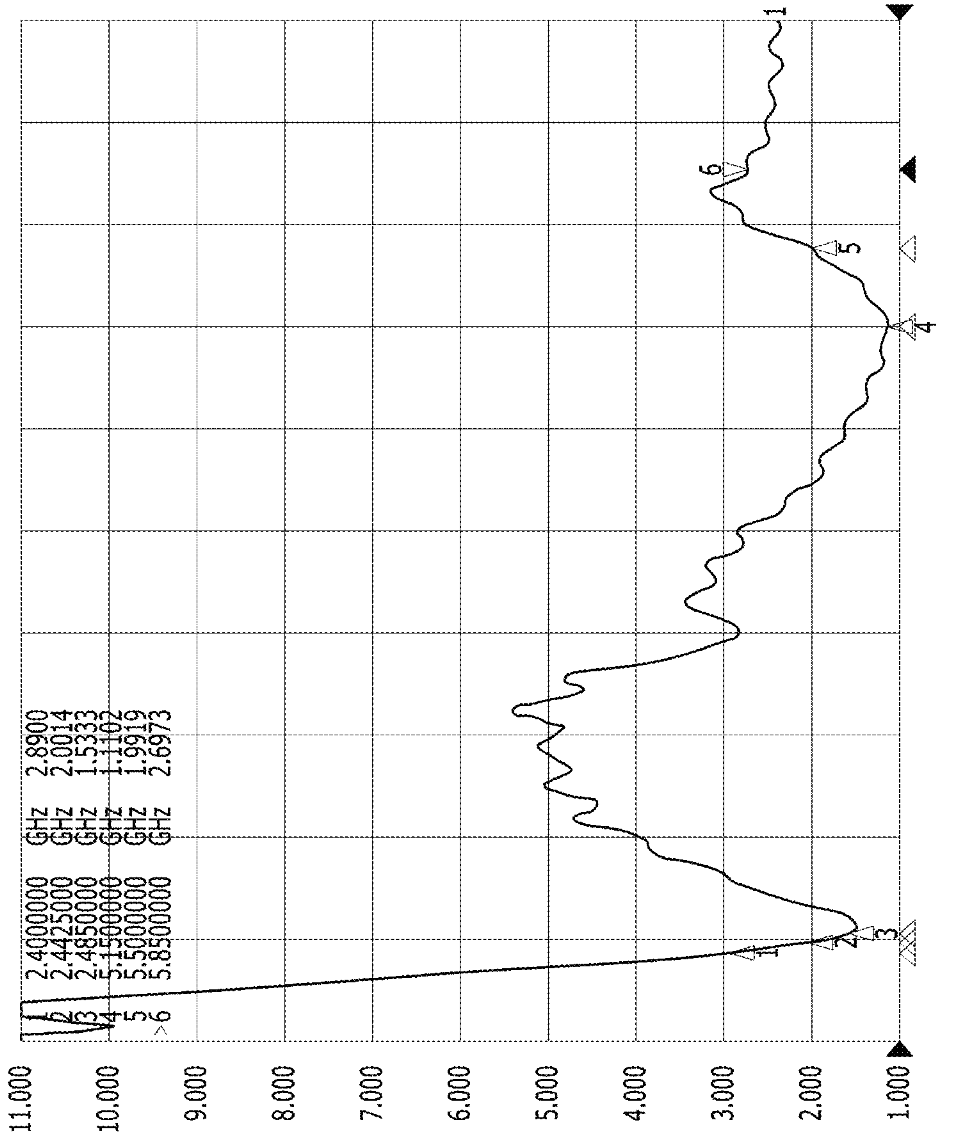
Figure 11:
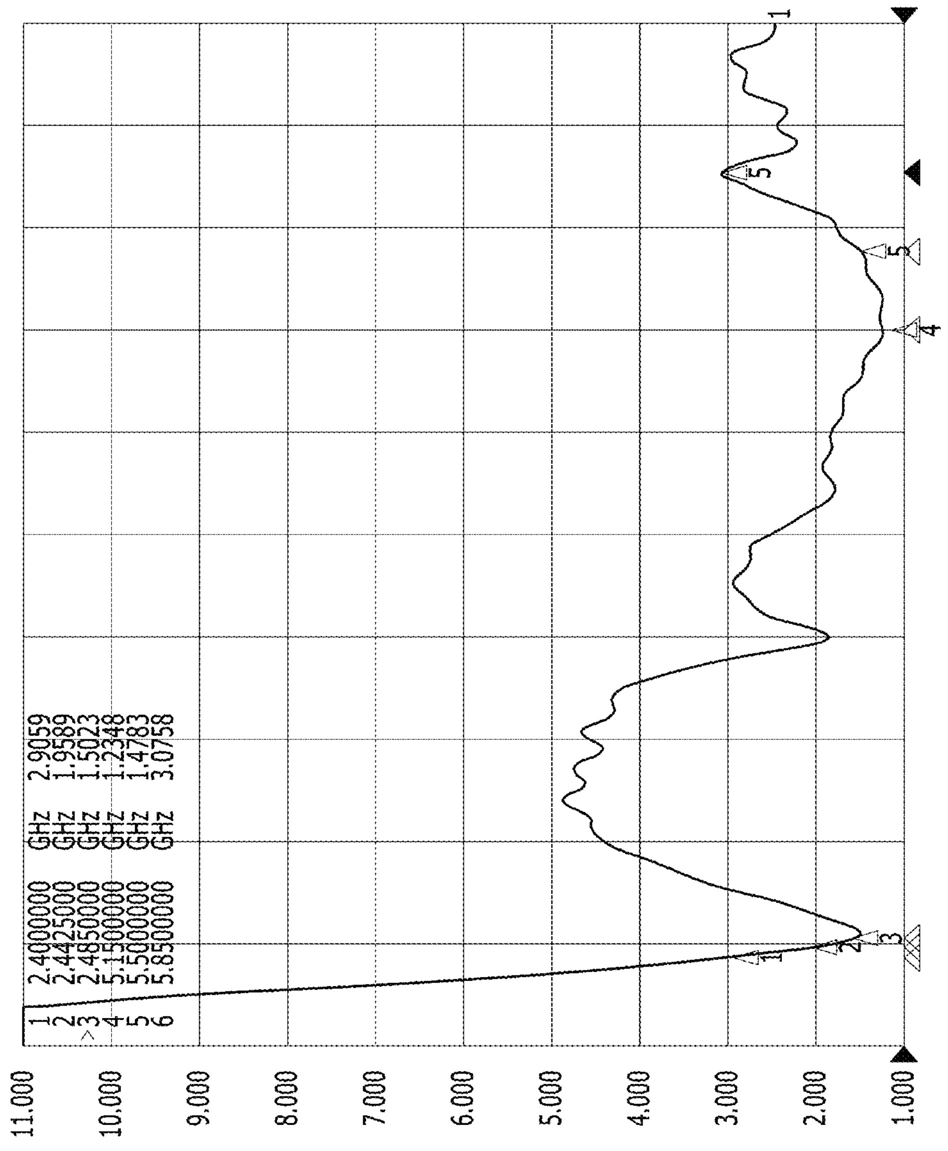

FIGS. 10 to 12 are diagrams for describing voltage standing wave ratio (VSWR) characteristics among the antenna characteristics of the multi-band antenna module 100 to which the circuit board 300 illustrated in FIGS. 8 and 9 has been applied. FIG. 10 is a graph illustrating measured VSWRs (S parameters) of the multi-band antenna module 100 to which power was fed (Feed 1) through the first conductor pattern 320 in the multi-band antenna module 100 to which the circuit board 300 illustrated in FIGS. 8 and 9 has been applied. FIG. 11 is a graph illustrating measured VSWRs (or S parameters) of the multi-band antenna module 100 to which power was fed (Feed 2) through the second conductor pattern 340 in the multi-band antenna module 100 to which the circuit board 300 illustrated in FIGS. 8 and 9 has been applied. FIG. 12 is a table in which the VSWRs measured in FIGS. 10 and 11 have been arranged. In this case, in general, a VSWR that is required for an antenna for Wi-Fi is approximately 4 or less.

In Feed 1 of the multi-band antenna module 100 according to an embodiment of the present disclosure, the VSWR of approximately 2.89 was measured in 2400.00 MHZ, the VSWR of approximately 2.00 was measured in 2442.50 MHZ, and the VSWR of approximately 1.53 was measured in 2485.00 MHz.

Furthermore, in Feed 2 of the multi-band antenna module 100 according to an embodiment of the present disclosure, the VSWR of approximately 2.90 was measured in 2400.00 MHZ, the VSWR of approximately 1.95 was measured in 2442.50 MHZ, and the VSWR of approximately 1.50 was measured in 2485.00 MHZ.

Meanwhile, in Feed 1 of the multi-band antenna module 100 according to an embodiment of the present disclosure, the VSWR of approximately 1.11 was measured in 5150.00 MHZ, the VSWR of approximately 1.99 was measured in 5500.00 MHZ, and the VSWR of approximately 2.69 was measured in 5850.00 MHZ.

Furthermore, in Feed 2 of the multi-band antenna module 100 according to an embodiment of the present disclosure, the VSWR of approximately 1.23 was measured in 5150.00 MHZ, the VSWR of approximately 1.47 was measured in 5500.00 MHZ, and the VSWR of approximately 3.07 was measured in 5850.00 MHZ.

As described above, it may be seen that the multi-band antenna module 100 according to an embodiment of the present disclosure was measured to have the VSWRs, that is, a criterion or less, in all of the VSWRs of Feed 1 and Feed 2 in the first frequency band (i.e., a 2.4 GHz band) and a second frequency band (i.e., a 5 GHZ to 7 GHZ band) and satisfies the VSWR that is required for the antenna for Wi-Fi.

Figure 13:
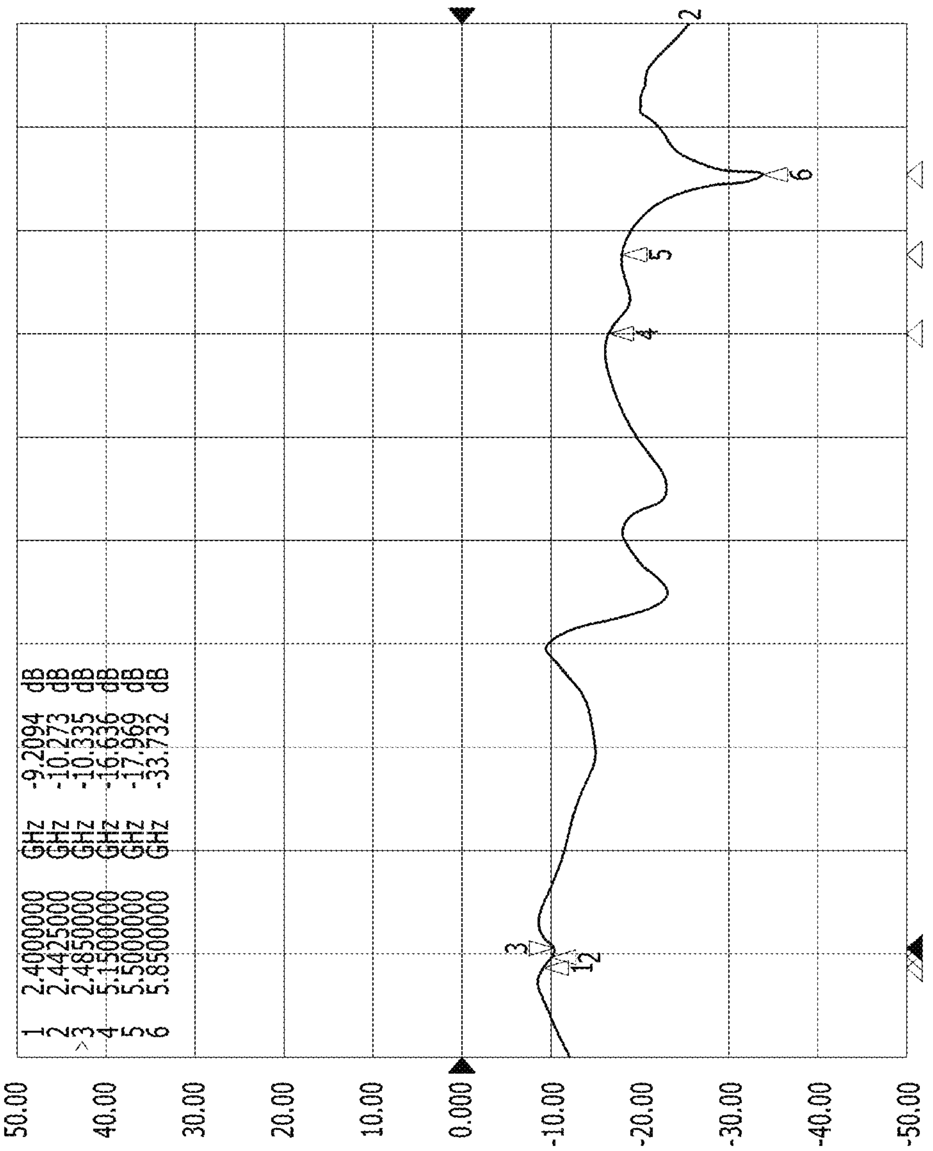

FIGS. 13 and 14 are diagrams for describing a separation (or isolation) characteristic among the antenna characteristics of the multi-band antenna module 100 to which the circuit board 300 illustrated in FIGS. 8 and 9 has been applied. In this case, an S parameter value that is required to satisfy the isolation characteristic of the antenna for Wi-Fi is approximately-10 dB or less.

The multi-band antenna module 100 according to an embodiment of the present disclosure was measured to have an S parameter value of approximately-10.1 dB in 2400.00 MHZ, to have an S parameter value of approximately −10.2 dB in 2442.50 MHZ, and to have an S parameter value of approximately −10.3 dB in 2485.00 MHz.

Furthermore, the multi-band antenna module 100 according to an embodiment of the present disclosure was measured to have an S parameter value of approximately −16.6 dB in 5150.00 MHZ, to have an S parameter value of approximately −19.9 dB in 5500.00 MHZ, and to have an S parameter value of approximately −33.7 dB in 5850.00 MHZ.

As described above, it may be seen that the multi-band antenna module 100 according to an embodiment of the present disclosure was measured to have the S parameters values, that is, a criterion or less, in both the first frequency band (i.e., the 2.4 GHz band) and the second frequency band (i.e., the 5 GHZ band) and satisfies the isolation characteristic that is required for the antenna for Wi-Fi.

FIG. 15 is a diagram for describing efficiency and average gains among the antenna characteristics of the multi-band antenna module 100 to which the circuit board 300 illustrated in FIGS. 8 and 9 has been applied. In this case, in general, efficiency that is required for the antenna for Wi-Fi is approximately 30% or more and an average gain is approximately −5 dB or more.

In Feed 1 of the multi-band antenna module 100 according to an embodiment of the present disclosure, the efficiency of approximately 52.38% was measured in 2400.00 MHZ, the efficiency of approximately 65.17% was measured in 2442.50 MHZ, and the efficiency of approximately 49.99% was measured in 2485.00 MHZ. In Feed 1 of the multi-band antenna module 100, the efficiency of approximately 68.05% was measured in 5150.00 MHZ, the efficiency of approximately 40.65% was measured in 5500.00 MHZ, and the efficiency of approximately 50.02% was measured in 5850.00 MHZ.

Furthermore, in Feed 2 of the multi-band antenna module 100 according to an embodiment of the present disclosure, the efficiency of approximately 45.26% was measured in 2400.00 MHZ, the efficiency of approximately 62.14% was measured in 2442.50 MHZ, and the efficiency of approximately 55.27% was measured in 2485.00 MHZ. In Feed 2 of the multi-band antenna module 100, the efficiency of approximately 76.98% was measured in 5150.00 MHZ, the efficiency of approximately 64.86% was measured in 5500.00 MHZ, and the efficiency of approximately 36.46% was measured in 5850.00 MHz.

Meanwhile, in Feed 1 of the multi-band antenna module 100 according to an embodiment of the present disclosure, the average gain of approximately −2.81 dB was measured in 2400.00 MHZ, the average gain of approximately −1.86 dB was measured in 2442.50 MHZ, and the average gain of approximately −3.01 dB was measured in 2485.00 MHZ. In Feed 1 of the multi-band antenna module 100, the average gain of approximately −1.67 dB was measured in 5150.00 MHZ, the average gain of approximately −3.91 dB was measured in 5500.00 MHZ, and the average gain of approximately −3.01 dB was measured in 5850.00 MHZ.

Furthermore, in Feed 2 of the multi-band antenna module 100 according to an embodiment of the present disclosure, the average gain of approximately −3.44 dB was measured in 2400.00 MHZ, the average gain of approximately −2.07 dB was measured in 2442.50 MHZ, and the average gain of approximately −2.58 dB was measured in 2485.00 MHZ. In Feed 2 of the multi-band antenna module 100, the average gain of approximately −1.14 dB was measured in 5150.00 MHZ, the average gain of approximately −1.88 dB was measured in 5500.00 MHZ, and the average gain of approximately −4.38 dB was measured in 5850.00 MHZ.

As described above, it may be seen that the multi-band antenna module 100 according to an embodiment of the present disclosure was measured to have the efficiency and the average gains, that is, a criterion or more, in both the first frequency band (i.e., the 2.4 GHz band) and the second frequency band (i.e., the 5 GHZ band) and satisfies an efficiency characteristic and an average gain characteristic that are required in the antenna for Wi-Fi.

As described above, the multi-band antenna module 100 according to an embodiment of the present disclosure satisfies all of antenna characteristics that are required for a common Wi-Fi antenna in the first frequency band and the second frequency band that were tested.

Figure 16:
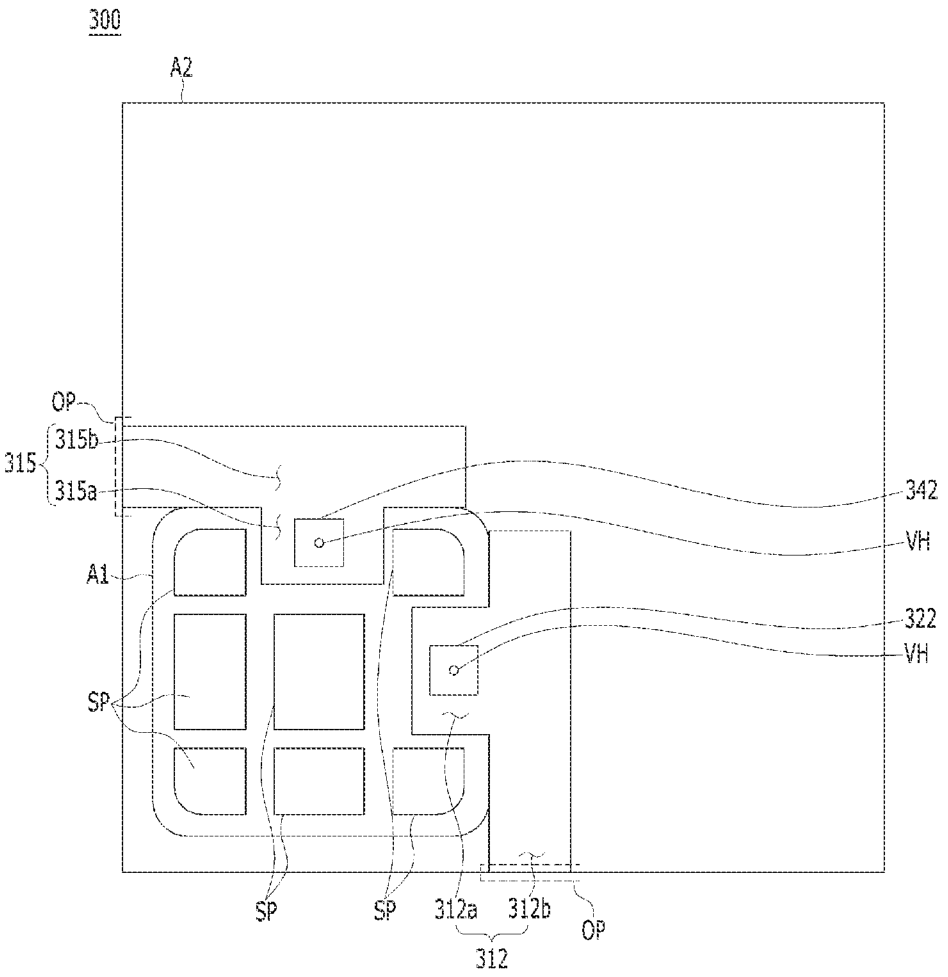
FIGS. 16 and 17 are a top view and bottom view of a circuit board for describing a fourth embodiment of the circuit board of FIG. 1.
Figure 17:
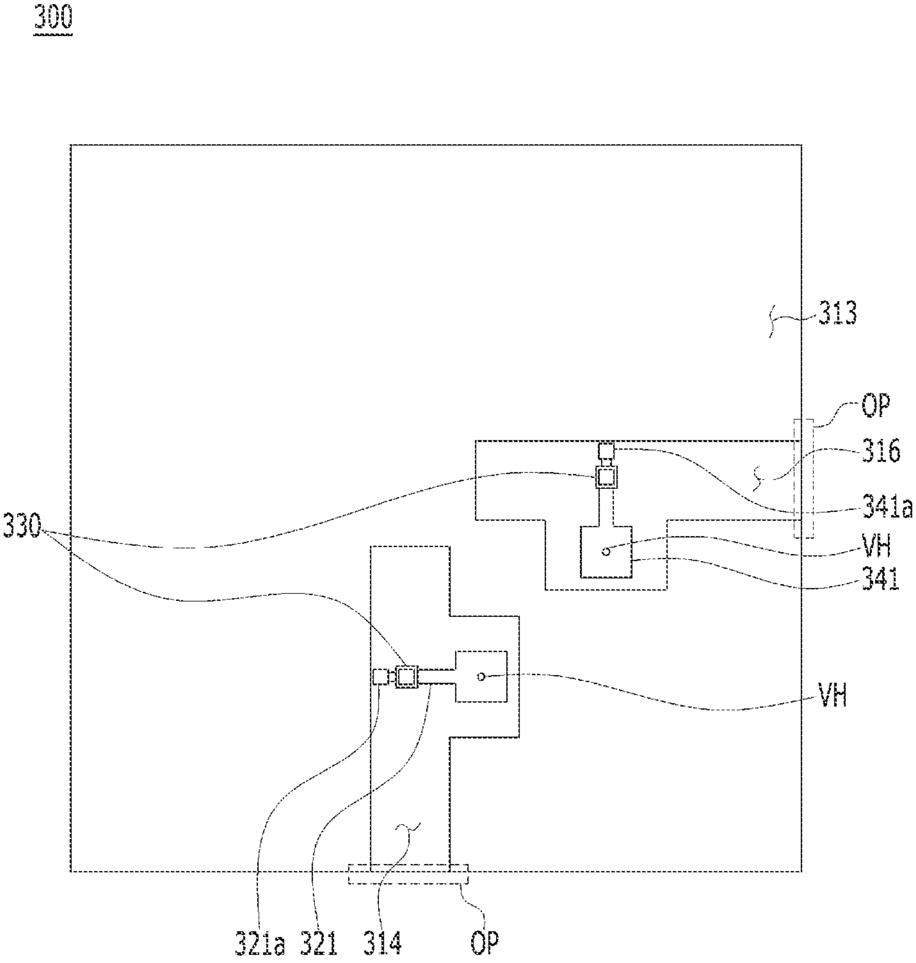

Referring to FIGS. 16 and 17, the third pattern 341 may be disposed in the second lower clearance area 316. In this case, a second end of the third pattern 341 is connected to the fourth pattern 342 through the via hole VH.

In this case, the third pattern 341 may be formed simultaneously with the forming of the second lower clearance area 316. The fourth pattern 342 may be formed simultaneously with the forming of the second upper clearance area 315. That is, the third pattern 341 is formed by removing the metal layer and coverlay layer of areas except an area corresponding to the third pattern 341 in a process of forming the second lower clearance area 316. The fourth pattern 342 is formed by removing the metal layer and coverlay layer of areas except an area corresponding to the fourth pattern 342 in a process of forming the second upper clearance area 315.

Accordingly, the third pattern 341 may be formed as an island pattern within the second lower clearance area 316. The fourth pattern 342 may be formed as an island pattern within the third clearance area 315*a* of the second upper clearance area 315.

Figure 18:
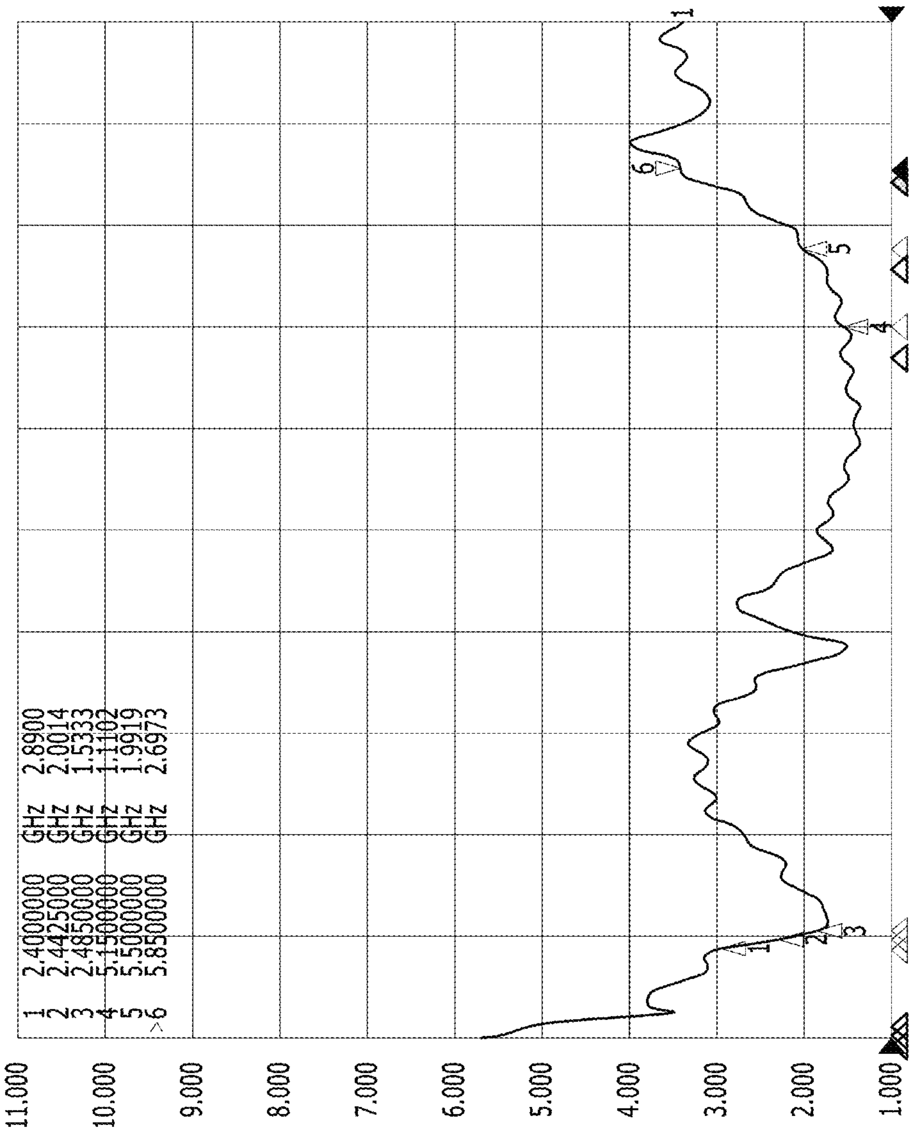
Figure 19:
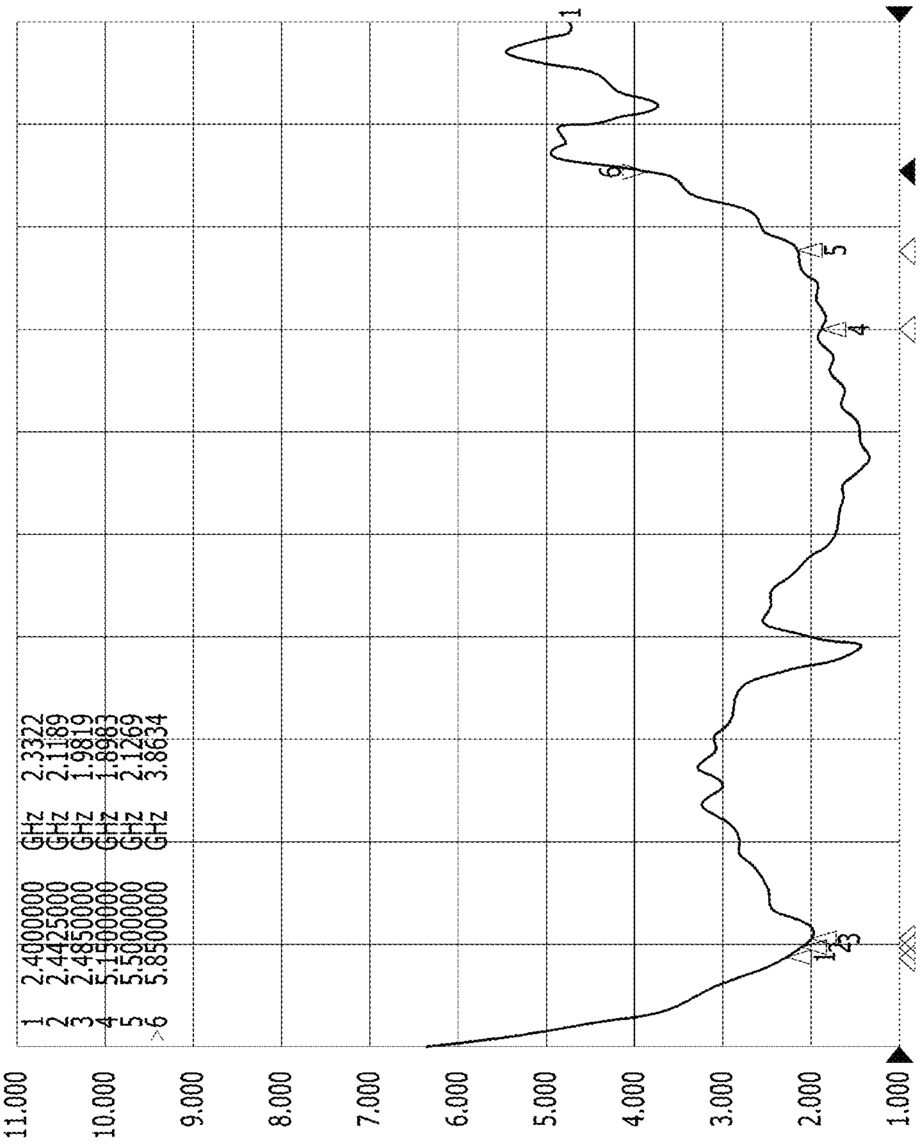

FIGS. 18 to 20 are diagrams for describing VSWR characteristics among the antenna characteristics of the multi-band antenna module 100 to which the circuit board 300 illustrated in FIGS. 16 and 17 has been applied. FIG. 18 is a graph illustrating measured VSWRs (or S parameters) of the multi-band antenna module 100 to which power was fed (Feed 1) through the first conductor pattern 320 in the multi-band antenna module 100 to which the circuit board 300 illustrated in FIGS. 16 and 17 has been applied. FIG. 19 is a graph illustrating measured VSWRs (or S parameters) of the multi-band antenna module 100 to which power was fed (Feed 2) through the second conductor pattern 340 in the multi-band antenna module 100 to which the circuit board 300 illustrated in FIGS. 16 and 17 has been applied. FIG. 20 is a table in which the VSWRs measured in FIGS. 18 and 19 have been arranged. In this case, in general, the VSWR that is required for an antenna for Wi-Fi is approximately 4 or less.

In Feed 1 of the multi-band antenna module 100 according to an embodiment of the present disclosure, the VSWR of approximately 2.93 was measured in 2400.00 MHZ, the VSWR of approximately 2.26 was measured in 2442.50 MHZ, and the VSWR of approximately 1.80 was measured in 2485.00 MHZ.

Furthermore, in Feed 2 of the multi-band antenna module 100 according to an embodiment of the present disclosure, the VSWR of approximately 2.33 was measured in 2400.00 MHZ, the VSWR of approximately 2.11 was measured in 2442.50 MHZ, and the VSWR of approximately 1.98 was measured in 2485.00 MHZ.

Meanwhile, in Feed 1 of the multi-band antenna module 100 according to an embodiment of the present disclosure, the VSWR of approximately 1.56 was measured in 5150.00 MHZ, the VSWR of approximately 2.03 was measured in 5500.00 MHZ, and the VSWR of approximately 3.41 was measured in 5850.00 MHZ.

Furthermore, in Feed 2 of the multi-band antenna module 100 according to an embodiment of the present disclosure, the VSWR of approximately 1.89 was measured in 5150.00 MHZ, the VSWR of approximately 2.12 was measured in 5500.00 MHZ, and the VSWR of approximately 3.86 was measured in 5850.00 MHZ.

As described above, it may be seen that the multi-band antenna module 100 according to an embodiment of the present disclosure was measured to have the VSWRs, that is, a criterion or less, in all of the VSWRs of Feed 1 and Feed 2 in the first frequency band (i.e., the 2.4 GHz band) and the second frequency band (i.e., the 5 GHZ band) and satisfies the VSWR that is required for the antenna for Wi-Fi.

Figure 21:
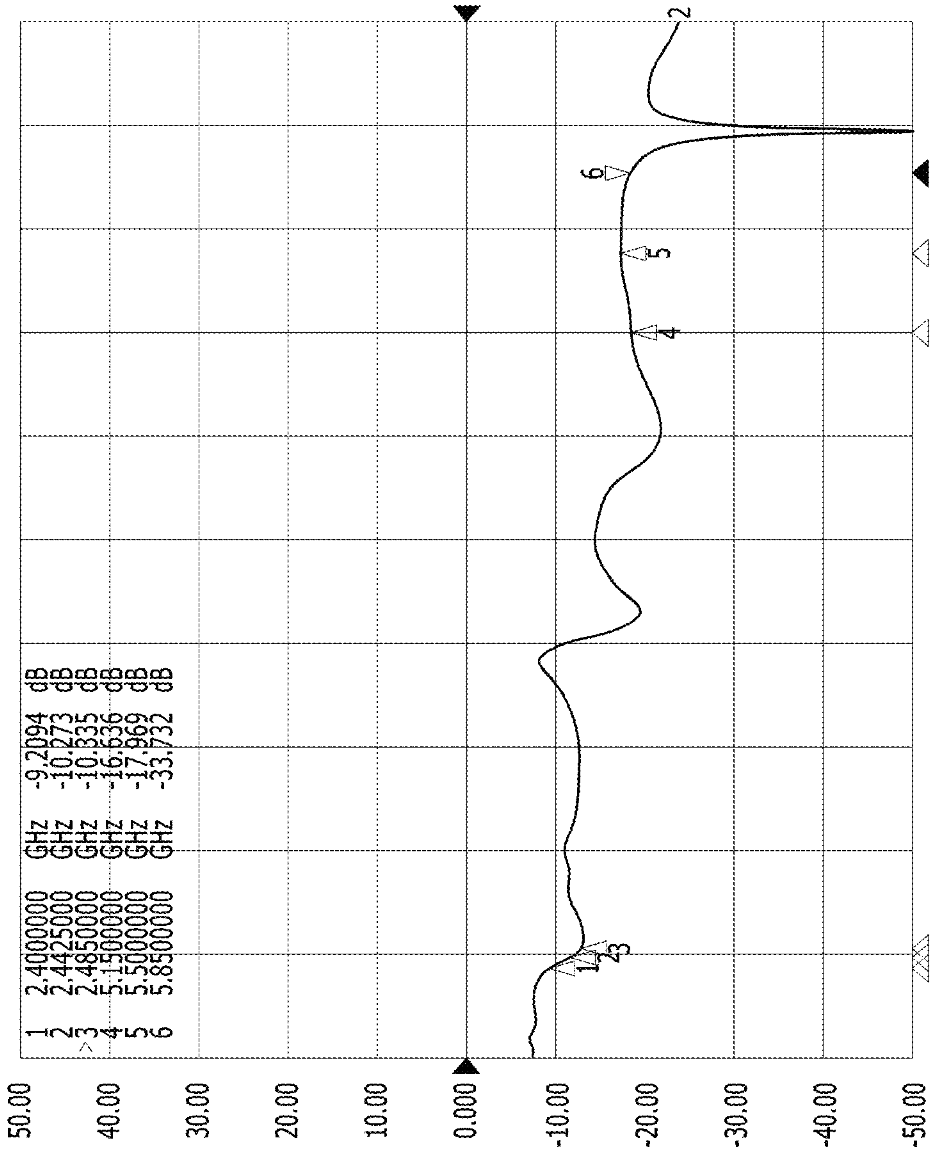

FIGS. 21 and 22 are diagrams for describing a separation (or isolation) characteristic among the antenna characteristics of the multi-band antenna module 100 to which the circuit board 300 illustrated in FIGS. 16 and 17 has been applied. In this case, an S parameter value that is required to satisfy the isolation characteristic of an antenna for Wi-Fi is approximately-10 dB or less.

The multi-band antenna module 100 according to an embodiment of the present disclosure was measured to have an S parameter value of approximately −10.1 dB in 2400.00 MHZ, to have an S parameter value of approximately −11.7 dB in 2442.50 MHZ, and to have an S parameter value of approximately −13 dB in 2485.00 MHZ.

Furthermore, the multi-band antenna module 100 according to an embodiment of the present disclosure was measured to have an S parameter value of approximately −18.4 dB in 5150.00 MHZ, to have an S parameter value of approximately −17.4 dB in 5500.00 MHZ, and to have an S parameter value of approximately −18.6 dB in 5850.00 MHZ.

As described above, it may be seen that the multi-band antenna module 100 according to an embodiment of the present disclosure was measured to have the S parameter values, that is, a criterion or less, in both the first frequency band (i.e., the 2.4 GHz band) and the second frequency band (i.e., the 5 GHZ band) and satisfies the isolation characteristic that is required for the antenna for Wi-Fi.

FIG. 23 is a diagram for describing efficiency and average gains among the antenna characteristics of the multi-band antenna module 100 to which the circuit board 300 illustrated in FIGS. 16 and 17 has been applied. In this case, in general, efficiency that is required for an antenna for Wi-Fi is approximately 30% or more, and an average gain is approximately −5 dB or more.

In Feed 1 of the multi-band antenna module 100 according to an embodiment of the present disclosure, the efficiency of approximately 46.51% was measured in 2400.00 MHZ, the efficiency of approximately 70.97% was measured in 2442.50 MHZ, and the efficiency of approximately 63.61% was measured in 2485.00 MHZ. In Feed 1 of the multi-band antenna module 100, the efficiency of approximately 72.46% was measured in 5150.00 MHZ, the efficiency of approximately 49.28% was measured in 5500.00 MHZ, and the efficiency of approximately 43.05% was measured in 5850.00 MHZ.

Furthermore, in Feed 2 of the multi-band antenna module 100 according to an embodiment of the present disclosure, the efficiency of approximately 36.40% was measured in 2400.00 MHZ, the efficiency of approximately 57.18% was measured in 2442.50 MHZ, and the efficiency of approximately 57.16% was measured in 2485.00 MHZ. In Feed 2 of the multi-band antenna module 100, the efficiency of approximately 74.89% was measured in 5150.00 MHZ, the efficiency of approximately 50.24% was measured in 5500.00 MHZ, and the efficiency of approximately 41.55% was measured in 5850.00 MHZ.

Meanwhile, in Feed 1 of the multi-band antenna module 100 according to an embodiment of the present disclosure, the average gain of approximately −3.32 dB was measured in 2400.00 MHZ, the average gain of approximately −1.49 dB was measured in 2442.50 MHZ, and the average gain of approximately −1.96 dB was measured in 2485.00 MHZ. In Feed 1 of the multi-band antenna module 100, the average gain of approximately −1.40 dB was measured in 5150.00 MHZ, the average gain of approximately −3.07 dB was measured in 5500.00 MHZ, and the average gain of approximately −3.66 dB was measured in 5850.00 MHZ.

Furthermore, in Feed 2 of the multi-band antenna module 100 according to an embodiment of the present disclosure, the average gain of approximately −4.39 dB was measured in 2400.00 MHZ, the average gain of approximately −2.43 dB was measured in 2442.50 MHZ, and the average gain of approximately −2.43 dB was measured in 2485.00 MHZ. In Feed 2 of the multi-band antenna module 100, the average gain of approximately −1.26 dB was measured in 5150.00 MHZ, the average gain of approximately −2.99 dB was measured in 5500.00 MHZ, and the average gain of approximately −3.81 dB was measured in 5850.00 MHZ.

As described above, it may be seen that the multi-band antenna module 100 according to an embodiment of the present disclosure was measured to have the efficiency and the average gains, that is, a criterion or more, in both the first frequency band (i.e., the 2.4 GHz band) and the second frequency band (i.e., the 5 GHZ band) and satisfies the efficiency characteristic and the average gain characteristic that are required for the antenna for Wi-Fi.

As described above, the multi-band antenna module 100 according to an embodiment of the present disclosure satisfies all of antenna characteristics that are required for a common Wi-Fi antenna in the first frequency band and the second frequency band that were tested.

An example in which the multi-band antenna module 100 according to an embodiment of the present disclosure has been constructed by mounting the patch antenna 200 on the independent circuit board 300 has been described, but the present disclosure is not limited thereto and may be modified in various forms. For example, the multi-band antenna module 100 may be constructed by using the circuit board 300 of a wireless LAN card. That is, the circuit board 300 of the wireless LAN card is extended, and the circuit board 300 is constructed in an extended area. A manufacturer may manufacture, as a product, an assembly in which the circuit board 300 has been integrated with the wireless LAN card. In this case, a power feed line for the patch antenna 200 and the monopole antenna may be formed by further forming a clearance area in the ground area of the circuit board 300 and forming a power feed conductor in the clearance area.

A manufacturer may manufacture, as a product, an assembly in which a wireless LAN card and the multi-band antenna according to an embodiment of the present disclosure have been integrated by mounting the patch antenna 200 on the circuit board 300 formed in the wireless LAN card.

Furthermore, an example in which the multi-band antenna module 100 according to an embodiment of the present disclosure has the structure in which the circuit board 300 and the patch antenna 200 have been integrated has been described, but the present disclosure is not limited thereto and may be modified in various forms. For example, after manufacturers separately manufacture the circuit board 300 and the patch antenna 200 and then deliver the circuit board 300 and the patch antenna 200, the multi-band antenna module 100 may be generated by combining the circuit board 300 and the patch antenna 200. A manufacturer may generate the multi-band antenna module 100 in which the circuit board 300, the patch antenna 200, and a power feed cable have been manufactured as one assembly.

As described above, although the preferred embodiments according to the present disclosure have been described, it is understood that the present disclosure may be changed in various forms and a person having ordinary knowledge in the art to which the present disclosure pertains may practice variously modified examples and revised examples without departing from the claims of the present disclosure.

The invention claimed is:

1. A multi-band antenna module comprising:

a circuit board; and a patch antenna disposed on an upper surface of the circuit board and configured to transmit or receive a signal having a first frequency band, wherein a first conductor pattern that transmits or receives a signal having a second frequency band while feeding power to the patch antenna is formed in the circuit board, wherein a first area that is an area in which the patch antenna is mounted, a second area that is remaining areas except the first area, and a clearance area that is an area covering the first area and the second area are defined on at least one surface of the upper surface and the lower surface of the circuit board, and wherein the first conductor pattern is formed as an island pattern that is formed to be isolated from an outer circumference of the clearance area within the clearance area.

2. The multi-band antenna module of claim 1, wherein the patch antenna comprises:

a dielectric;

an upper patch disposed on an upper surface of the dielectric;

a first lower patch having a first slot formed therein and disposed on a lower surface of the dielectric; and a second lower patch disposed on the lower surface of the dielectric and disposed so that the second lower patch is accommodated in a space that is formed by the first slot and the lower surface of the dielectric.

3. The multi-band antenna module of claim 2, wherein the first area, the second area, and a first upper clearance area that is an area covering the first area and the second area are defined on the upper surface of the circuit board.

4. The multi-band antenna module of claim 3, wherein the first upper clearance area comprises:

a first clearance area that is formed in the first area and that overlaps the patch antenna; and a second clearance area that is formed in the second area, that is combined with the first clearance area, and that has an opening formed on one side thereof.

5. The multi-band antenna module of claim 3, wherein:

a first lower clearance area symmetrical to the first upper clearance area is further defined in a lower surface of the circuit board, and the first conductor pattern comprises a first pattern disposed in the first lower clearance area, and a second pattern that is disposed in a first clearance area of the first upper clearance area and that overlaps the patch antenna, a first connection pad connected to the power feed part is formed at a first end of the first pattern, and the second pattern is connected to a second end of the first pattern through a via hole.

6. The multi-band antenna module of claim 4, wherein the first conductor pattern comprises:

a first pattern disposed to cover the first clearance area and the second clearance area; and a second pattern that is disposed in the first clearance area and that overlaps the patch antenna, wherein a first connection pad connected to a power feed part is formed at a first end of the first pattern, and the second pattern is connected to a second end of the first pattern.

7. The multi-band antenna module of claim 6, wherein:

the second pattern forms a power feed pad by being connected to the second lower patch, and the power feed pad is connected to the upper patch by coupling in a state in which the power feed pad has been spaced apart from the upper patch.

8. The multi-band antenna module of claim 6, wherein the circuit board further comprises a matching circuit connected to the first pattern.

9. A multi-band antenna module comprising:

a circuit board; and a patch antenna disposed on an upper surface of the circuit board and configured to transmit or receive a signal having a first frequency band, wherein a first conductor pattern and a second conductor pattern that transmit or receive a signal having a second frequency band while feeding power to the patch antenna are formed in the circuit board, wherein a first area that is an area in which the patch antenna is mounted, a second area that is remaining areas except the first area, a first clearance area that is an area covering the first area and the second area, and a second clearance area that is an area that is isolated from the first clearance area and that covers the first area and the second area are defined on at least one surface of the upper surface and the lower surface of the circuit board, wherein the first conductor pattern is formed as an island pattern that is formed to be isolated from an outer circumference of the first clearance area within the first clearance area, and wherein the second conductor pattern is formed as an island pattern that is formed to be isolated from an outer circumference of the second clearance area within the second clearance area.

10. The multi-band antenna module of claim 9, wherein the patch antenna comprises:

a dielectric;

an upper patch disposed on an upper surface of the dielectric;

a first lower patch having a first slot and a second slot formed therein and disposed on a lower surface of the dielectric;

a second lower patch disposed on the lower surface of the dielectric and disposed so that the second lower patch is accommodated in a space that is formed by the first slot and the lower surface of the dielectric; and a third lower patch disposed on the lower surface of the dielectric and disposed so that the third lower patch is accommodated in a space that is formed by the second slot and the lower surface of the dielectric.

11. The multi-band antenna module of claim 10, wherein the first area, the second area, a first upper clearance area that is an area covering the first area and the second area, and a second upper clearance area that is an area that is isolated from the first upper clearance area and that covers the first area and the second area are defined on the upper surface of the circuit board.

12. The multi-band antenna module of claim 11, wherein:

the first upper clearance area comprises a first clearance area that is formed in the first area and that overlaps the patch antenna, and a second clearance area that is formed in the second area, that is combined with the first clearance area, and that has an opening formed on one side thereof, and the second upper clearance area comprises a third clearance area that is formed in the first area, that is isolated from the first clearance area, and that overlaps the patch antenna, and a fourth clearance area that is formed in the second area, that is isolated from the second clearance area, that is combined with the third clearance area, and that has an opening formed on one side thereof.

13. The multi-band antenna module of claim 11, wherein:

a first lower clearance area symmetrical to the first upper clearance area and a second lower clearance area symmetrical to the second upper clearance area are further defined on the lower surface of the circuit board, the first conductor pattern comprises a first pattern disposed in the first lower clearance area, and a second pattern that is disposed in a first clearance area of the first upper clearance area and that overlaps the patch antenna, a first connection pad to which a power feed part is connected is formed at a first end of the first pattern, and the second pattern is connected to a second end of the first pattern through a via hole, the second conductor pattern comprises a third pattern disposed in the second lower clearance area, and a fourth pattern that is disposed in a third clearance area of the second upper clearance area and that overlaps the patch antenna, and a second connection pad connected to a power feed part is formed at a first end of the third pattern, and the fourth pattern is connected to a second end of the third pattern through a via hole.

14. The multi-band antenna module of claim 13, wherein a first virtual straight line that connects the first pattern and the second pattern and a second virtual straight line that connects the third pattern and the fourth pattern are orthogonal to each other.

15. The multi-band antenna module of claim 12, wherein:

the first conductor pattern comprises a first pattern disposed to cover the first clearance area and the second clearance area and a second pattern that is disposed in the first clearance area and that overlaps the patch antenna, a first connection pad connected to the power feed part is formed at a first end of the first pattern, and the second pattern is connected to a second end of the first pattern, the second conductor pattern comprises a third pattern disposed to cover the third clearance area and the fourth clearance area and a fourth pattern that is disposed in the third clearance area and that overlaps the patch antenna, and a second connection pad connected to a power feed part is formed at a first end of the third pattern, and the fourth pattern is connected to a second end of the third pattern.

16. The multi-band antenna module of claim 15, wherein the second pattern forms a power feed pad by being connected to the second lower patch, the fourth pattern forms another power feed pad by being connected to the third lower patch, and the power feed pad and the another power feed pad are spaced apart from each other, and are connected to the upper patch by coupling in a state in which the power feed pad and the another power feed pad have been spaced apart from the upper patch.

17. The multi-band antenna module of claim 15, wherein the circuit board further comprises a matching circuit connected to the first pattern and another matching circuit connected to the third pattern.

* * * * *